United States Patent
Fukuda et al.

(10) Patent No.: US 7,085,995 B2
(45) Date of Patent: Aug. 1, 2006

(54) INFORMATION PROCESSING APPARATUS AND PROCESSING METHOD AND PROGRAM STORAGE MEDIUM

(75) Inventors: Kei Fukuda, Kanagawa (JP); Motoyuki Suzuki, Kanagawa (JP); Muneaki Osawa, Kanagawa (JP); Kentaro Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 09/937,463

(22) PCT Filed: Jan. 23, 2001

(86) PCT No.: PCT/JP01/00420

§ 371 (c)(1),
(2), (4) Date: Sep. 24, 2001

(87) PCT Pub. No.: WO01/56281

PCT Pub. Date: Aug. 2, 2001

(65) Prior Publication Data
US 2002/0154158 A1    Oct. 24, 2002

(30) Foreign Application Priority Data
Jan. 26, 2000   (JP) ............................ P2000-016613

(51) Int. Cl.
*G06F 15/00* (2006.01)
(52) U.S. Cl. .................................... 715/500.1; 715/723
(58) Field of Classification Search ............. 715/500.1, 715/512, 723, 716; 345/723, 473
See application file for complete search history.

(56) References Cited

U.S. PATENT DOCUMENTS

| | | | | |
|---|---|---|---|---|
| 5,386,581 A | * | 1/1995 | Suzuki et al. | 715/515 |
| 5,537,528 A | * | 7/1996 | Takahashi et al. | 715/512 |
| 5,649,046 A | * | 7/1997 | Stewart et al. | 386/52 |
| 5,659,790 A | * | 8/1997 | Kim et al. | 715/500.1 |

(Continued)

FOREIGN PATENT DOCUMENTS

EP    0 843 311 A2    5/1998

(Continued)

OTHER PUBLICATIONS

Alattar, Wipe Scene Change Detector for Segmenting Uncompressed Video Sequences, IEEE 1998, pp. IV-249-250.*

(Continued)

*Primary Examiner*—Cong-Lac Huynh
(74) *Attorney, Agent, or Firm*—Frommer Lawrence & Haug LLP; William S. Frommer

(57) ABSTRACT

An information processing apparatus for suitably corresponding a plurality of images as an editing object to each of a plurality of scenes constituting scenario data. In the apparatus, when a read button (211) is operated, a material clip (212) as an editing object is displayed on a material tray (201). When a tag (271-1) is selected, a shaker window having a section button (281) is displayed. Scenarios correspond to a plurality of selection buttons (281), respectively. The number of scenes, an effect given to each scene and the like are designated to each scenario. A user selects one selection button (281) to select one scenario. When a shake button (285) is operated, a predetermined one is selected at random out of material clips (212) designated in advance by a user to assign it to each scene of the scenario selected by the user.

18 Claims, 26 Drawing Sheets

U.S. PATENT DOCUMENTS

| | | | |
|---|---|---|---|
| 5,717,438 A * | 2/1998 | Kim et al. | 715/500.1 |
| 5,752,029 A * | 5/1998 | Wissner | 707/104.1 |
| 5,801,685 A * | 9/1998 | Miller et al. | 715/500.1 |
| 5,854,887 A * | 12/1998 | Kindell et al. | 725/86 |
| 5,966,121 A * | 10/1999 | Hubbell et al. | 715/726 |
| 5,999,173 A * | 12/1999 | Ubillos | 715/724 |
| 6,006,241 A * | 12/1999 | Purnaveja et al. | 715/512 |
| 6,032,156 A * | 2/2000 | Marcus | 707/104.1 |
| 6,072,479 A * | 6/2000 | Ogawa | 707/104.1 |
| 6,144,391 A * | 11/2000 | Hinson et al. | 345/540 |
| 6,154,600 A * | 11/2000 | Newman et al. | 386/4 |
| 6,195,088 B1 * | 2/2001 | Signes | 715/500.1 |
| 6,211,453 B1 * | 4/2001 | Kurakake | 84/609 |
| 6,400,378 B1 * | 6/2002 | Snook | 345/716 |
| 6,400,832 B1 * | 6/2002 | Sevigny | 382/103 |
| 6,404,978 B1 * | 6/2002 | Abe | 386/55 |
| 6,421,726 B1 * | 7/2002 | Kenner et al. | 709/225 |
| 6,430,582 B1 * | 8/2002 | Duncombe | 715/500.1 |
| 6,452,875 B1 * | 9/2002 | Lee et al. | 369/30.04 |
| 6,487,565 B1 * | 11/2002 | Schechter et al. | 715/500.1 |
| 6,544,293 B1 * | 4/2003 | Ohanian | 715/500.1 |
| 6,571,052 B1 * | 5/2003 | Wakimoto et al. | 386/55 |
| 6,587,109 B1 * | 7/2003 | Rose et al. | 345/473 |
| 6,597,375 B1 * | 7/2003 | Yawitz | 715/723 |
| 6,621,504 B1 * | 9/2003 | Nadas et al. | 715/723 |
| 6,628,303 B1 * | 9/2003 | Foreman et al. | 715/723 |
| 6,654,930 B1 * | 11/2003 | Zhou et al. | 715/500.1 |
| 6,710,785 B1 * | 3/2004 | Asai et al. | 715/723 |
| 6,714,216 B1 * | 3/2004 | Abe | 345/723 |
| 6,792,573 B1 * | 9/2004 | Duncombe | 715/500.1 |
| 6,954,894 B1 * | 10/2005 | Balnaves et al. | 715/500.1 |
| 6,957,388 B1 * | 10/2005 | Taguchi et al. | 715/723 |
| 2001/0020953 A1 * | 9/2001 | Moriwake et al. | 345/723 |
| 2001/0040575 A1 * | 11/2001 | Haga et al. | 345/473 |
| 2001/0048486 A1 * | 12/2001 | Akama et al. | 348/700 |
| 2002/0037153 A1 * | 3/2002 | Slone | 386/52 |
| 2004/0078761 A1 * | 4/2004 | Ohanian | 715/530 |
| 2004/0098515 A1 * | 5/2004 | Rezvani et al. | 709/400 |

FOREIGN PATENT DOCUMENTS

| | | |
|---|---|---|
| EP | 0 915 469 A2 | 5/1999 |
| JP | 7-46462 | 2/1995 |
| JP | 9-146918 | 6/1997 |
| JP | 9-270992 | 10/1997 |
| JP | 10-200814 | 7/1998 |
| JP | 10-248048 | 9/1998 |
| JP | 11-146333 | 5/1999 |
| JP | 2000-50204 | 2/2000 |
| JP | 2000-149045 | 5/2000 |

OTHER PUBLICATIONS

Mackay et al., Virtual Video Editing in Interactive Multimedia Applications, ACM 1989, pp. 802-810.*

Matthews et al., VideoScheme : A Programmable Video Editing System for Automation and Media Recongnition, ACM Sep. 1993, pp. 1-8.*

Myers et al., A Multi-View Intelligent Editor for Digital Video Libraries, ACM 2001, pp. 106-115.*

Baecker et al., A Multimedia System for Authoring Motion Pictures, ACM 1996, pp. 31-42.*

* cited by examiner

| ANIMATION | .MOV .AVI |
| STATIONARY IMAGE | .BMP .GIF .JPG .PNG .PCT |
| MUSIC | .WAV .AIF |

FIG.11

| FRAME NO. | ANIMATION EFFECT | TRANSITION | TRANSITION TIMING | COLOR TONE EFFECT | BLACK MAT BACKGROUND |
|---|---|---|---|---|---|
| 00.06 | 99 | 0 | 0 | 99 | 1 |
| 04.09 | 99 | 0 | 0 | 21 | 0 |
| 07.01 | 99 | 0 | 0 | 21 | 0 |
| 09.28 | 99 | 0 | 0 | 21 | 0 |
| 15.19 | 99 | 0 | 0 | 21 | 0 |
| 19.27 | 99 | 0 | 0 | 21 | 0 |
| 24.03 | 99 | 0 | 0 | 21 | 0 |
| 28.09 | 99 | 0 | 0 | 21 | 0 |
| 33.29 | 99 | 0 | 0 | 21 | 0 |
| 36.12 | 99 | 99 | 0 | 99 | 1 |

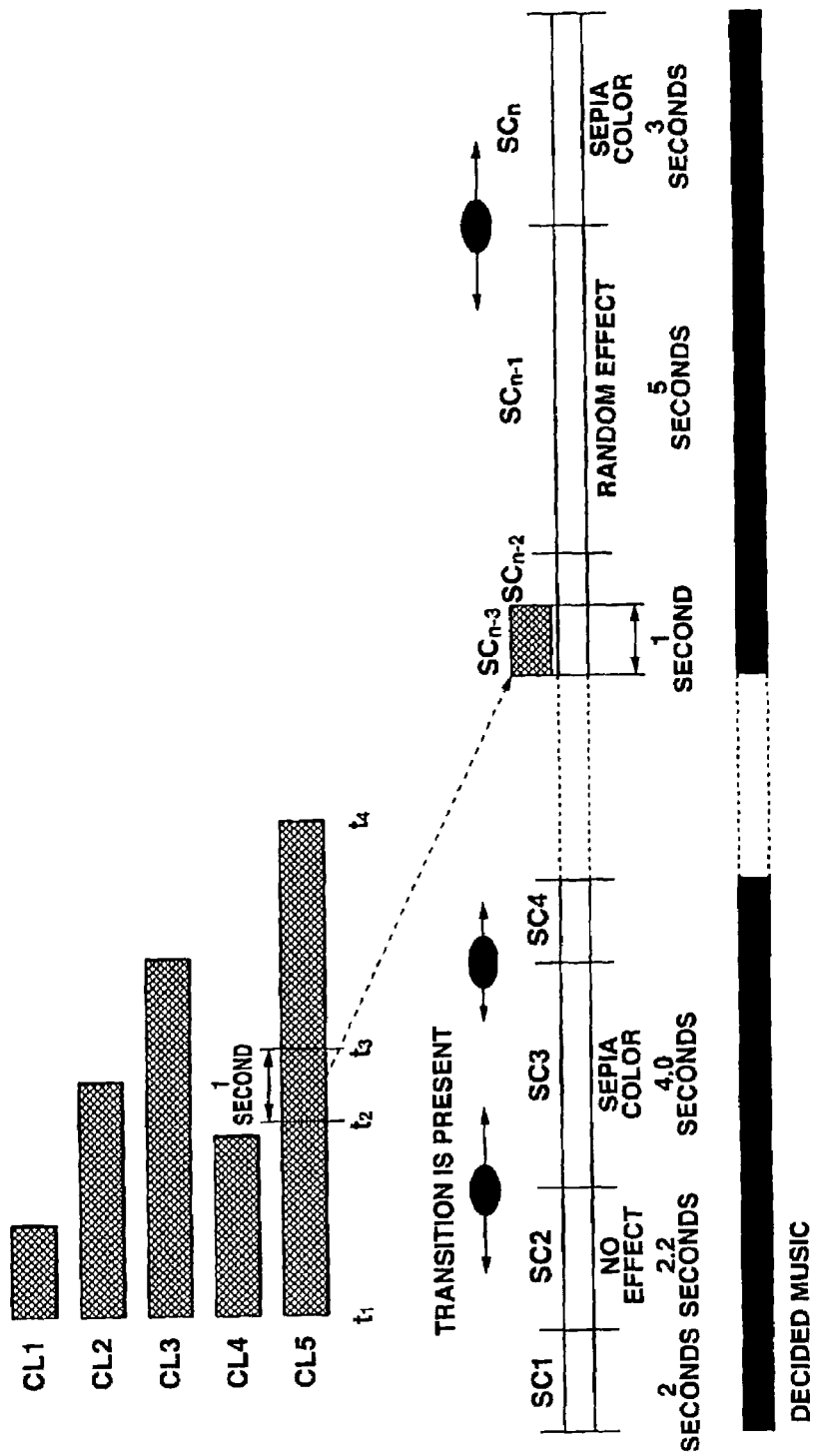

INFORMATION PROCESSING APPARATUS AND PROCESSING METHOD AND PROGRAM STORAGE MEDIUM

TECHNICAL FIELD

The present invention relates to an information processing apparatus and processing method, and a storage medium, and particularly, relates to an information processing apparatus and processing method, and a program storage medium for the purpose of editing image data.

BACKGROUND ART

With the enhancement of function, a personal computer is capable of editing not only text data but also image data.

For editing image data using a personal computer, it is necessary that a user has to learn operating function of a personal computer, and it takes time to obtain the intended result of edition.

DISCLOSURE OF THE INVENTION

It is an object of the present invention to solve the problem noted above with respect to the conventional information processing apparatus of a personal computer and to provide a new information processing apparatus and processing method, and a program storage medium capable of editing image data simply and quickly.

The information processing apparatus according to the present invention comprises a storage medium for storing scenario data constituted by a plurality of scenes, and corresponding means for suitably corresponding a plurality of images as an editing objects to the respective plurality of scenes constituting scenario data stored in the memory medium.

Hereupon, the plurality of scenes can be made to predetermined lengths difference from each other. There can be further provided modifying means for modifying an image corresponded by the corresponding means in adjustment to the length of a scene.

There can be further provided reproducing means for continuously reproducing a plurality of images corresponded by the corresponding means on the basis of scenario data.

The reproducing means can apply special effect information to a plurality of images on the basis of predetermined special effect information corresponded to a scene to reproduce it.

There is further provided deciding means for suitably deciding special effect information to be corresponded out of a plurality of special effect information with respect to a scene, and the reproducing means applies special effect information to a plurality of images on the basis of the decided result of the deciding means to reproduce it.

The corresponding means suitably corresponds a plurality of images as editing objects with respect to a plurality of scenes of scenario data selected out of a plurality of scenario data.

There can be further provided registration means for registering images as editing means, image information display means for displaying in list information relating to a plurality of image information as editing objects, and output information display means for arranging and displaying information relating to a plurality of images corresponded by the corresponding means in accordance with order of a plurality of scenes.

The corresponding means is able to carry out corresponding using a scenario corresponding to instructions from a user out of a first scenario with repetitive continuous reproducing as a premise and a first scenario with repetitive continuous reproducing as not a premise.

Further, the information processing method according to the present invention includes a correspondence processing step for suitably corresponding a plurality of images as editing objects with respect to a plurality of respective scenes constituting scenario data, a modification processing step for modifying respective images corresponded in adjustment with lengths of respective scenes, and a reproducing processing step for continuously reproducing a plurality of images.

There can include a decision processing step for suitably deciding special effect information corresponded out of a plurality of special effect information with respect to scenes.

There can include an image information display processing step for displaying in list information relating to a plurality of images as editing objects, and an output information display processing system for arranging and displaying information relating to a plurality of images corresponded in the correspondence processing step in accordance with order of a plurality of scenes.

The program according to the present invention includes a correspondence processing step for suitably corresponding a plurality of images as editing objects with respect to a plurality of respective scenes constituting scenario data, a modification processing step for modifying respective images corresponded in adjustment with lengths of respective scenes, and a reproducing processing step for continuously reproducing a plurality of images.

There can further include a decision processing step fro suitably deciding special effect information out of plurality of special effect information with respect to scenes.

There can further include an image information display processing step for displaying in list information relating to a plurality of images as editing objects, and an output information display processing step for arranging and displaying information relating to a plurality of images corresponded in the correspondence processing step in accordance with order of a plurality of scenes.

In accordance with the information processing apparatus and the processing method, and the program, image information is corresponded to the obtained scene.

The other objects of the present invention, and the detailed advantages obtained by the present invention will be further apparent from the ensuing explanation of the embodiments.

BRIEF DESCRIPTION OF THE DRAWINGS

FIG. 11 is a view showing an example of an image file taken into the material tray shown in FIG. 8.

FIG. 28 is a view for explaining shaker process.

BEST MODE FOR CARRYING OUT THE INTENTION

The information processing apparatus according to the present invention will be described hereinafter with reference to the drawings. This information processing apparatus is constituted as a portable personal computer, which is constituted as sown in FIGS. 1 to 6. This personal computer 1 is constituted as a small note type personal computer, which comprises a body 2, and a display part 3 mounted to be opened and closed freely on the body 2, as shown in FIGS. 1 and 2.

Figure 1:
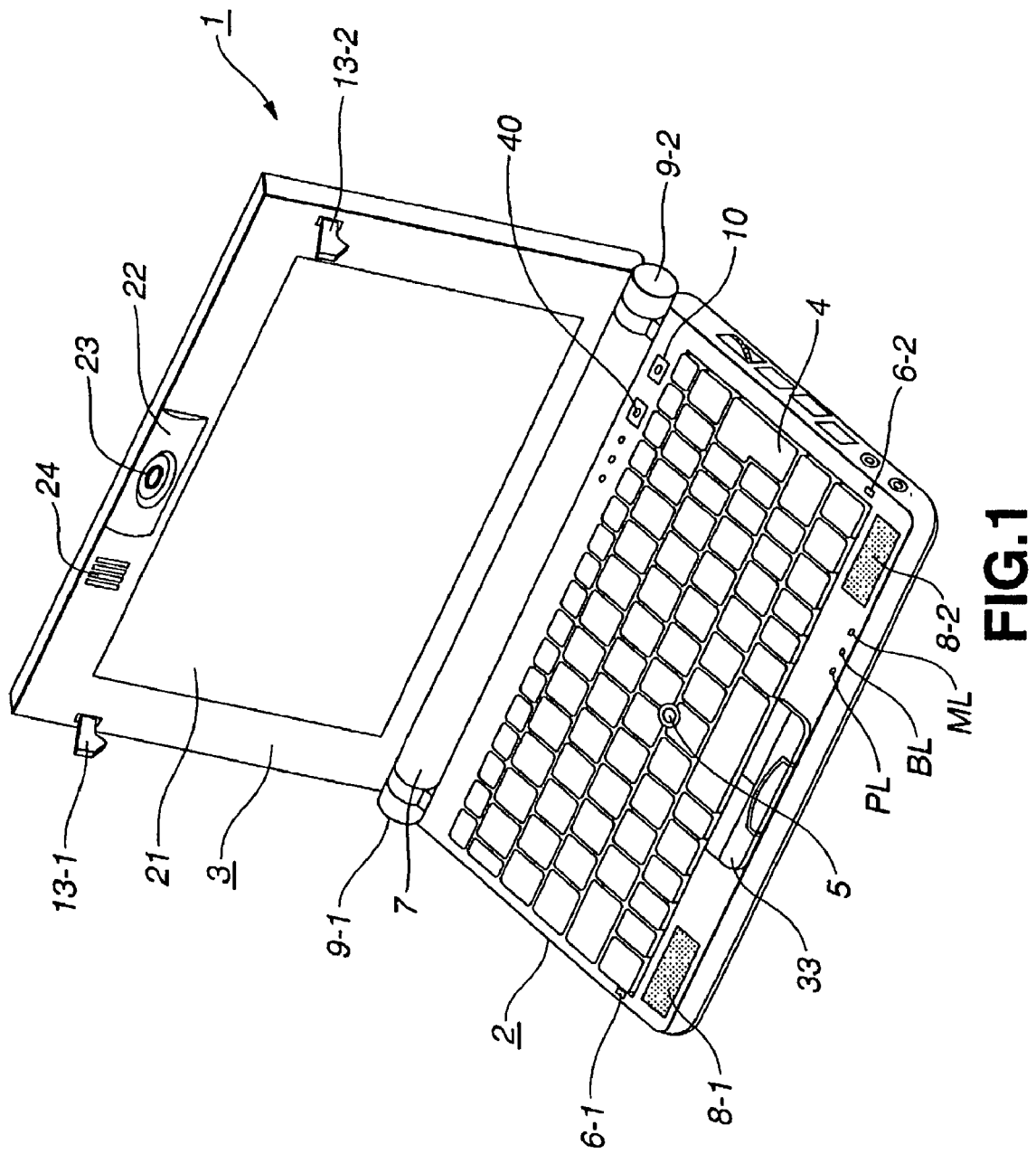
FIG. 1 is a perspective view showing an external appearance of a personal computer to which the present invention is applied, FIG. 2 being a plan view thereof, FIG. 3 being a left side view thereof, FIG. 4 being a right side view thereof, FIG. 5 being a front view thereof, and FIG. 6 being a bottom view thereof.
Figure 2:
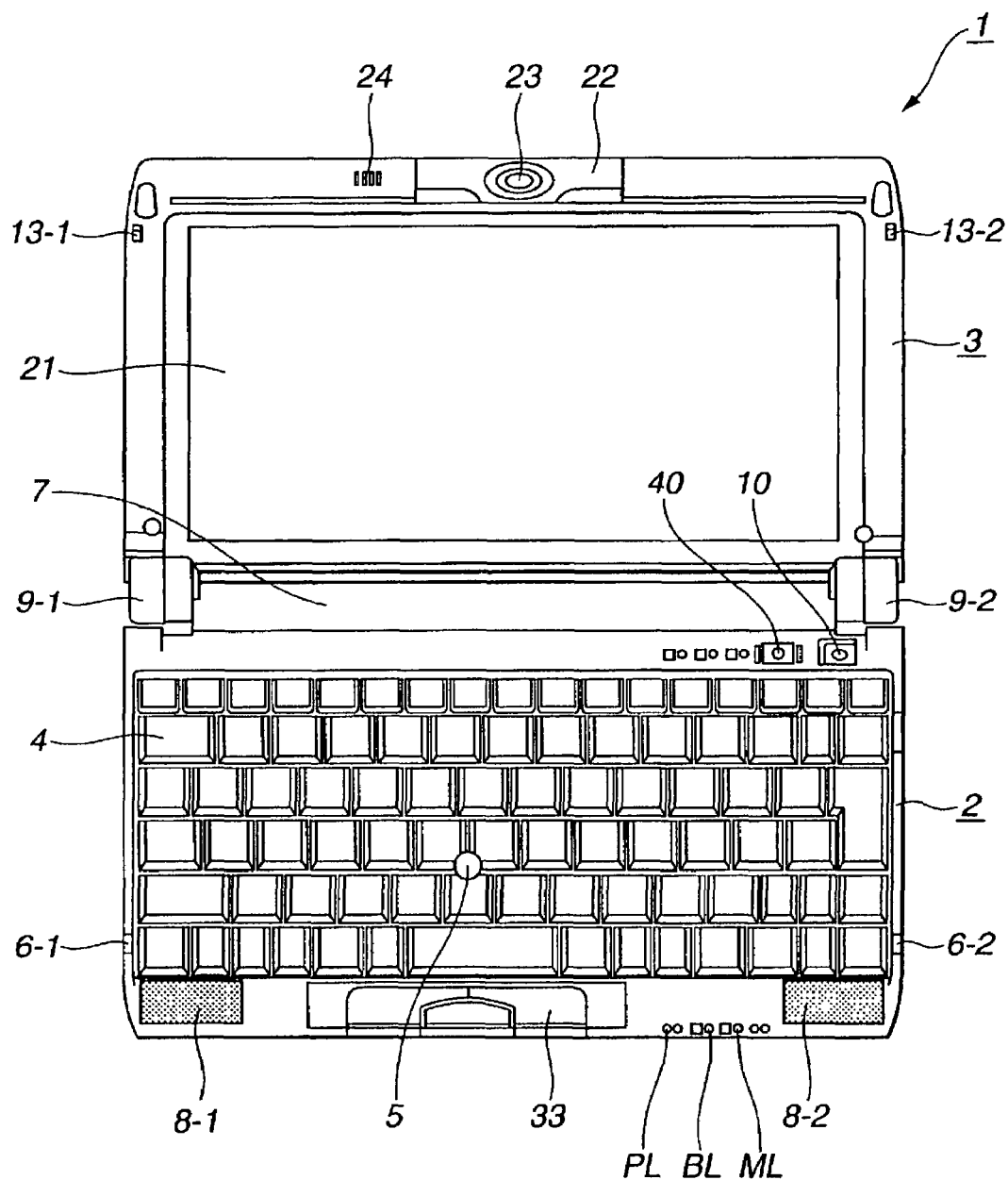
Figure 3:
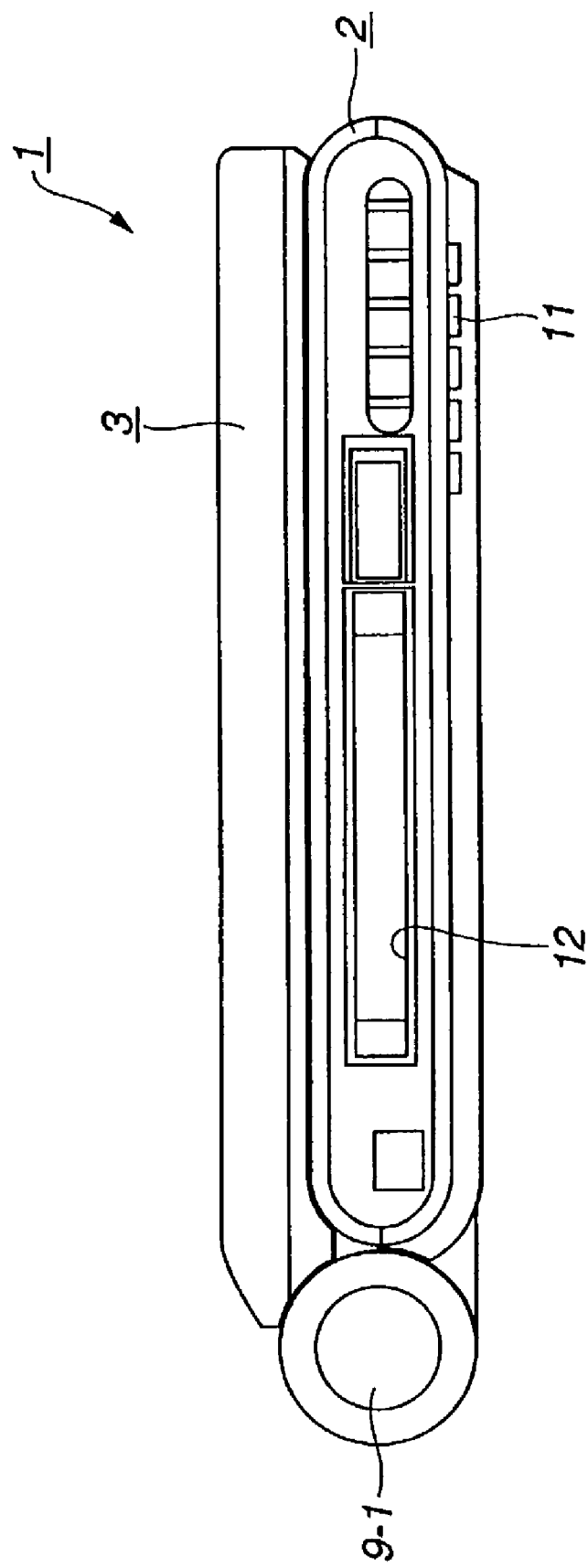
Figure 4:
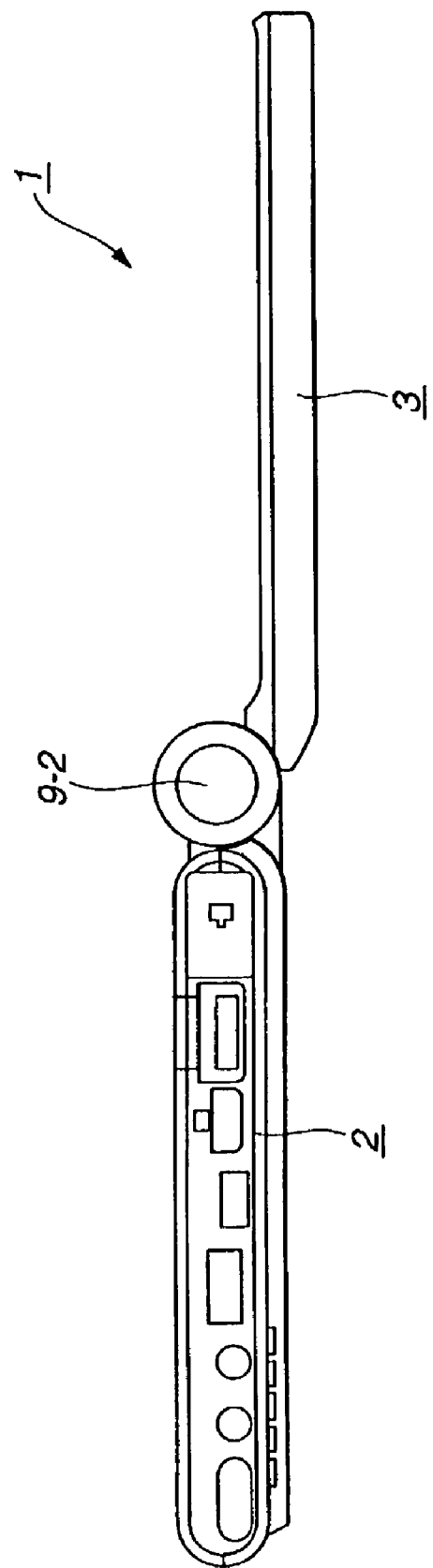
Figure 5:
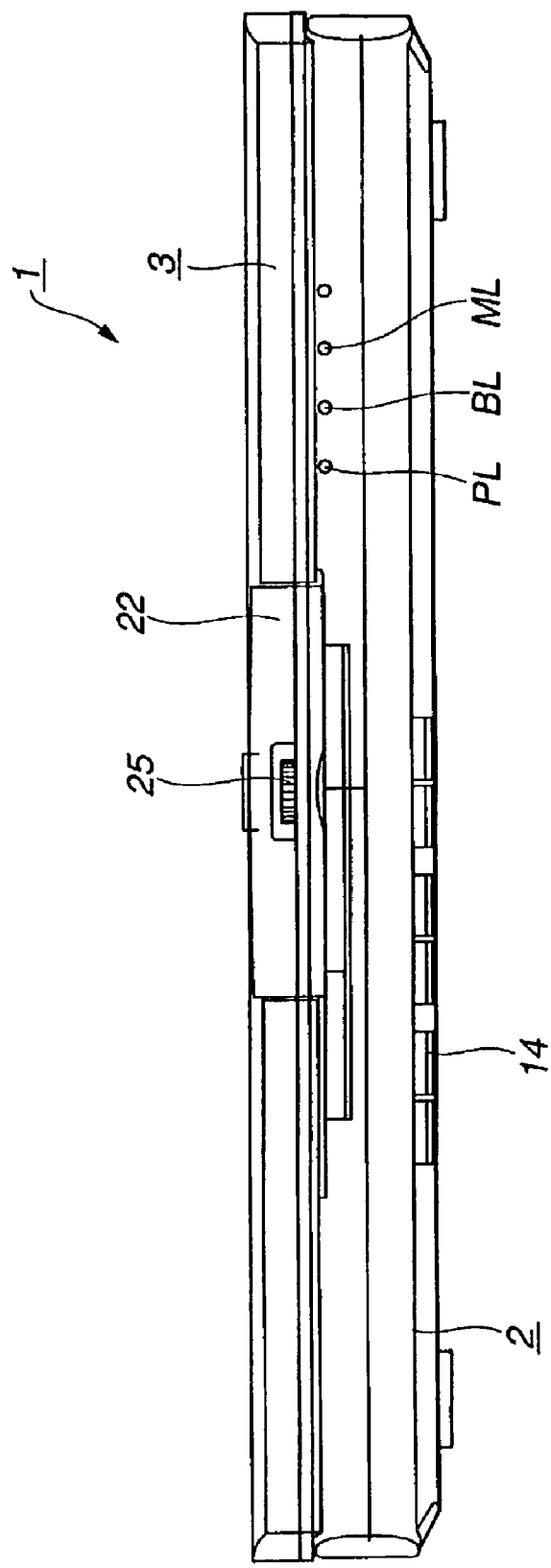
Figure 6:
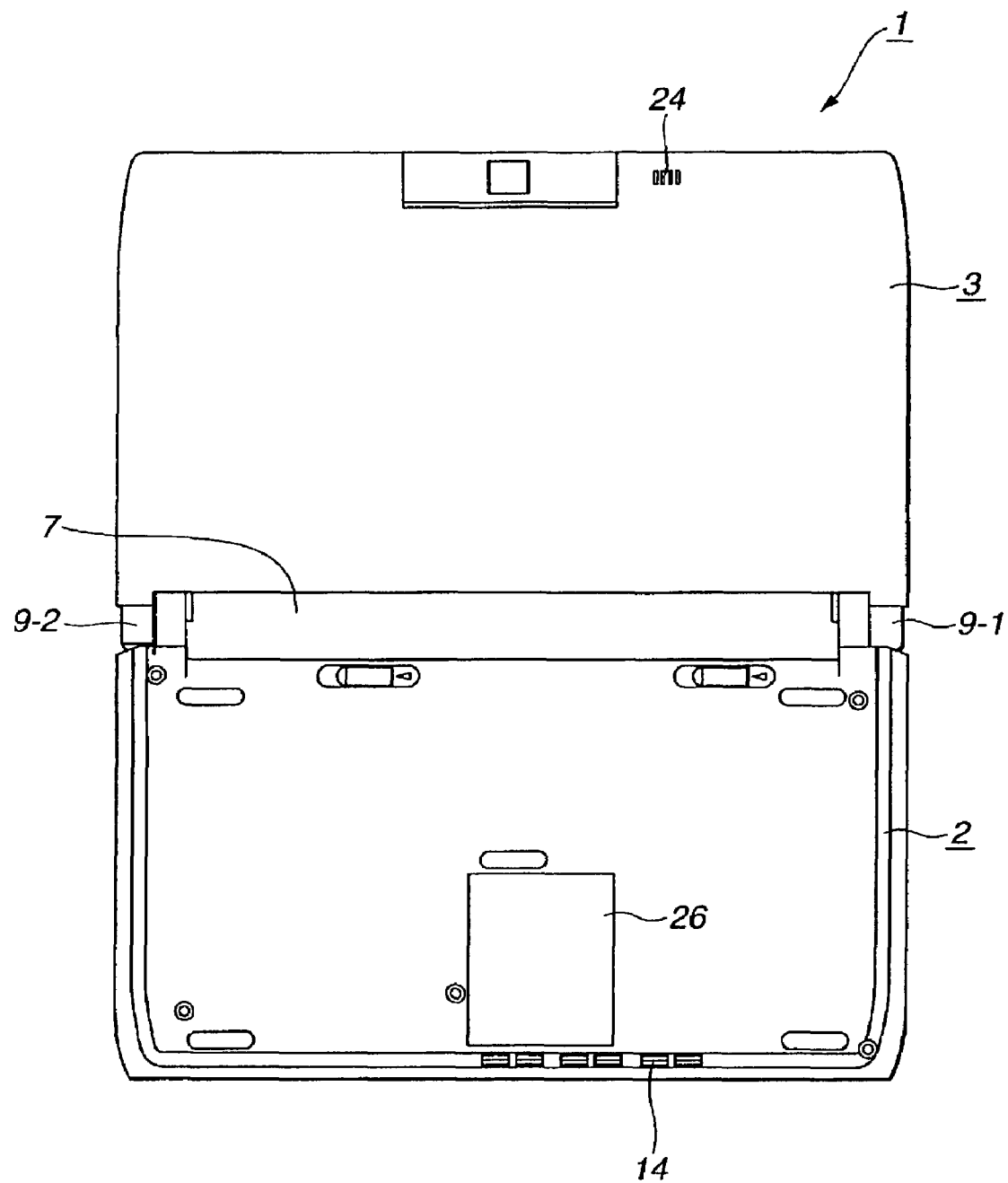

FIG. 1 is an external perspective view showing a state that the display part 3 of the personal computer 1 is opened with respect to the body 2, FIG. 2 being a plan view thereof, FIG. 3 being a left side view thereof showing a state that the display part 3 is closed with respect to the body 2, FIG. 4 being a right side view showing a state that the display part 3 is opened by 180 degrees with respect to the body 2, FIG. 5 being a front view thereof, and FIG. 6 being a bottom view thereof.

On the body 2 are provided a keyboard 4 operated when various letters or characters and symbols are input, and a stick system pointing device 5 when a mouse cursor is moved on the upper surface thereof. On the upper surface of the body 2 are further provided speakers 8-1, 8-2 for outputting sound, and a shutter button 10 operated when an image is picked up by a CCD video camera 23 provided on the display part 3.

The display part 3 is connected to be opened and closed freely to the body 2 by means of hinges 9-1 and 9-2. A battery 7 is detachably mounted between one hinge 9-1 and the other hinge 9-2 of the body 2.

A pair of pawls 13-1 and 13-2 are provided on the both sides on the extreme end side of the display part 3, as shown in FIG. 1. On the body 2 side are provided engaging holes 6-1 and 6-2 which come in engagement with the pawls 13-1 and 13-2 when the display part 3 is rotated in the state closed with respect to the body 2, as shown in FIG. 3.

On the extreme end side of the display part 3 is mounted a microphone 24 adjacent to an image pick-up part 22. The microphone 24 is constituted so as to enable collecting also sound incident from the back of the display part 3, as shown in FIG. 6.

The body 2 is provided on one side with an exhaust hole 11 as shown in FIG. 3, and is provided also at the lower part on the front side of the body 2 with a suction hole 14 as shown in FIG. 5. Further, on one side in which the exhaust hole 11 of the body 2 is provided a slot 12 into which a card in compliance with the standard defined by PCMCIA (Personal Computer Memory Card International Association), that is, a PC card is inserted, as shown in FIG. 3.

An LCD (Liquid Crystal Display) 21 for displaying an image is provided, as shown in FIGS. 1 and 2, in the front of the display part 3, and an image pick-up part 22 is provided rotatably with respect to the display part 3 on the upper end thereof. This image pick-up part 22 is constituted to be rotated to a suitable position in a range of 180 degrees between the front direction of the LCD 21 and the back direction on the opposite thereto. A CCD video camera 23 is mounted on the image pick-up part 22.

On the front end side on the face side in which th keyboard 4 of the body 2 is provided, there are provided a power lamp PL, a battery lamp BL, a message lamp ML, and other lamps formed of LED. On the rear end side to which the display part 3 of the body 2 is connected, there is provided a power switch 40 adjacent to the shutter button 10 as shown in FIG. 1. Further, on the front end of the body 2, there is provided an adjusting ring 25 for adjusting focussing of a CCD video camera 23, as shown in FIG. 5, and on the bottom side of the body 2, there is provided a mounting part for an expansion memory to be mounted on the body 2, as shown in FIG. 6. The mounting part is normally covered with a lid 26.

Figure 7:
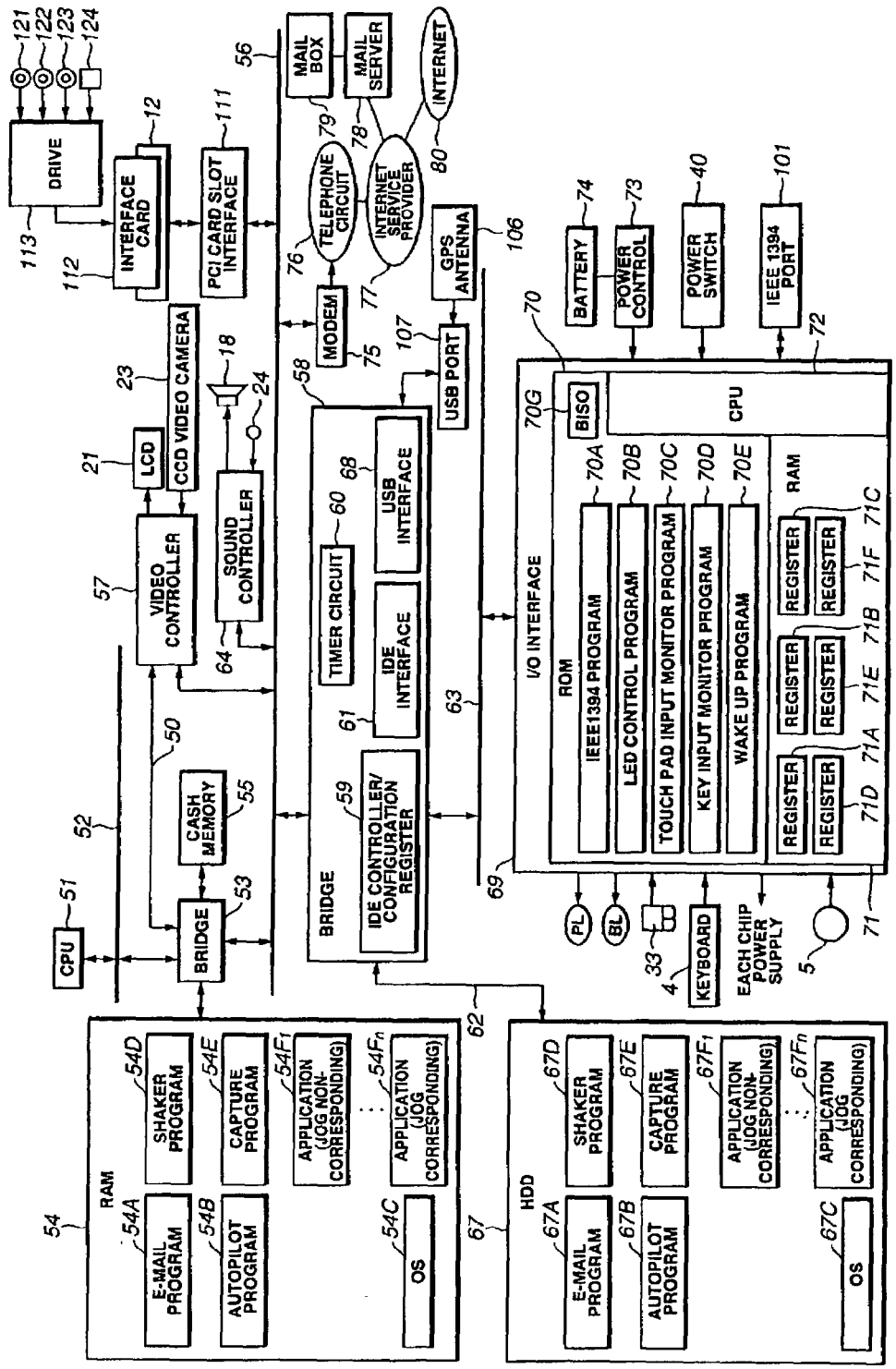
FIG. 7 is a block diagram showing a constitutional example of the interior of the personal computer shown in FIG. 1.

Next, the internal constitution of the personal computer 1 will be described with reference to FIG. 7.

A central processing unit (CPU) 51 is received and arranged in the personal computer 1. The CPU 51 is constituted by, for example, a Pentium (Trademark) processor or the like manufactured by Intel Co., and connected to a host bus 52. Further, a bridge 53, a so-called north bridge, is connected to the host bus 52. The bridge 53 has an accelerated graphics port (AGP) 50 and is connected to a peripheral component interconnect/interface (PCI) 56.

The bridge 53 is constituted by, for example, 400 BX or the like which is an AGP host bridge controller manufactured by Intel Co., to control CPU 51 and RAM (Random-Access Memory) 54 (so-called, main memory) and the like. Further, the bridge 53 controls a video controller 57 through AGP 50. It is noted that a so-called chip set is constituted by the bridge 53 and a bridge (so-called, south bridge (PCI-ISA Bridge)) 58.

The bridge 53 is also connected to a cash memory 55. The cash memory 55 is constituted by a memory capable of executing write or read operation at higher speed than RAM 54 such as SRAM (Static RAM) to temporarily store programs or data used by CPU 51.

It is noted that CPU 51 is internally provided with a memory which can be operated at higher speed than the cash memory 55 and a cash memory controlled by CPU 51 itself.

RAM 54 is constituted by, for example, DRAM (Dynamic RAM) to store programs executed by CPU 51 or data necessary for operation of CPU 51. Concretely, for example, RAM 54 stores e-mail program 54A, autopilot program 54B, operating program (OS) 54C, shaker program 54D, capture program 54E, and other application programs 54F1 to 54Fn, loaded from HDD 67 at the time when start is completed.

The e-mail program 54 is a program for delivering and receiving an electronic message, a so-called e-mail through a communication circuit such as a telephone circuit 76 through a modem 75. The e-mail program 54A has a received-mail obtaining function. The received-mail obtaining function ascertains a mail server 78 provided by an internet service provider 77 whether or not a mail addressed to a user is received within a mailbox 79, and if a mail addressed to a user is present, executes process for obtaining it.

The autopilot program 54B is a program which is processed by starting a plurality of preset processes (or programs) or the like in preset order.

The OS (Operating System) program 54C is, for example, a program which controls basic operation of a computer represented by a so-called Windows 95 (Trademark) of Windows 98 (Trademark) of Microsoft Co., or a so-called MacOS (Trademark) of the Apple Computer Co.

The shaker program 54D is a program which executes automatic editing process. The capture program 54E is a program which controls incorporation of a pickup image by the CCD video camera 23.

The video controller 57 is connected to the bridge 53 through AGP 50 to receive data (image data or text data) supplied from CPU 51 through the AGP 50 and the bridge 53 to produce imaged data corresponding to the received data or to store the received data without modification in a video memory (not shown) housed therein. The video controller 57 causes LCD 21 of the display part 3 to display an image corresponding to image data stored in the video memory. Further, the video controller 57 supplies video data supplied form the CCD video camera 23 to RAM 54 through the PCI bus 56.

A sound controller 64 is connected to the PCI bus 56. The sound controller 64 incorporates a signal corresponding to voice from the microphone 24 to produced data corresponding to voice to output it to RAM 54. Further, the controller 64 drives a loud speaker 8 to output voice to the loud speaker 8.

Further, the modem 75 is connected to the PCI bus 56. The modem 75 transmits predetermined data to a communication network 80 or a mail server 78 of an Internet or the like through a public telephone circuit 76 and an internet service provider 77, and receives predetermined data from the communication network 80 or the mail server 78.

A PC card slot interface 111 is connected to the PCI bus 56 to supply data supplied from an interface card 112 mounted in a slot 12 to CPU 51 or RAM 54, and outputs data supplied from CPU 51 to the interface card 112. A drive 113 is connected to the PCI bus 56 through the PC card slot interface 111 and the interface card 112.

The drive 113 reads data recorded in a magnetic disk 121, an optical disk 122, an optical magnetic disk 123 or a semiconductor memory 124 to be mounted as necessary, and supplies the read data to RAM 54 through the interface card 112, the PC card slot interface 111, and the PCI bus 56.

Further, a bridge 58, a so-called south bridge is also connected to the PCI bus 56. The bridge 58 is constituted by, for example, PIIX4E (Trademark) manufactured by Intel Co., and houses therein an IDE (Integrated Drive Electronics) controller/configuration register 59, a timer circuit 60, an IDE interface 61, and a USB interface 68 and so forth. The bridge 58 controls various kinds of I/O (Input/Output) such as a device connected to an IDE bus 62, or a device connected through an ISA/EIO (Industry Standard Architecture/Extended Input Output) bus 63 or an I/O interface 69.

The IDE controller/configuration register 59 is constituted by, though not shown, two IDE controllers, i.e., a so-called primary IDE controller and a secondary IDE controller, and a configuration register and so on.

HDD 67 is connected to the primary IDE controller through the IDE bus 62. Further, a so-called IDE device such as a CD-ROM drive or HDD not shown is mounted on other IDE bus, the mounted IDE device is electrically connected to the secondary IDE controller.

Recorded in the HDD 67 are a shaker program 67D, a capture program 67E, and others, a plurality of application programs 67F1 to 67Fn as an e-mail program 67A, an autopilot program 67B, OS67C, and an application program. The e-mail program 67A, the autopilot program 67B, the OS67C, the shaker program 67D, the capture program 67E, and the application programs 67 F1 to 67 Fn recorded in the HDD 67 are sequentially supplied and loaded on the RAM 54 during the start (boot-up) process.

The USB interface 68 receives an analogous noise code from a GPS antenna 106 connected through a USB port 107, and transmits the received analogous noise code to the RAM 54 through the PCI bus 56.

The timer circuit 60 supplies data indicative of the present time to the CPU 51 through the PCI bus 56 in response to a request from various programs.

An I/O interface 69 is further connected to the ISA/EIO bus 63. The I/O interface 69 is constituted by an embedded controller, and the ROM 70, the RAM 71, and the CP 72 are connected one another therein.

The ROM 70 stores in advance therein an IEEE 1394 interface program 70A, a LED control program 70B, a touch pad input monitor program 70C, a key input monitor program 70D, and a wake-up program 70E.

The IEEE 1394 interface program 70A transmits and receives data in compliance with the standard defined in IEEE 1394 (data stored in a packet) through an IEEE 1394 port 101. The LED control program 70B controls turning on/off of a power lamp PL, a battery lamp BL, and a message lamp ML or other lamps comprising LED as necessary. The touch pad input monitor program 70C is a program for monitoring input from a touch pad 33 corresponding to operation of a user.

The key input monitor program 70D is a program for monitoring input from the keyboard 4 or other key switches. The wake-up program 70E is a program which checks whether or not the time is a preset time on the basis of data indicative the present time supplied from the timer circuit 60 of the bridge 58, and administers power supplies of respective chips constituting the personal computer 1 in order to start the predetermined process or programs when the time is a set time.

A BIOS (Basic Input/Output System) 70G is further written in the ROM 70. The BIOS 70G controls reception and delivery of data, that is, input/output of data between OS or application program and peripheral equipment (touch pad 33, keyboard 4 or HDD 67).

The RAM 71 has an LED control, a touch pad input status, a key input status, or registers for the set time, or an IEEE 1394I/F register, as registers 71A to 71F. For example, in the LED control register, when the e-mail program 54A is started, a predetermined value is stored, and turning on/off of the message lamp ML is controlled in response to the value stored. The key input status register stores a predetermined operating key flag. In the set time register, a predetermined time is set in response to operation of the keyboard 4 by a user.

The touch pad 33, the keyboard 4, the IEEE1394 port 101 and the shutter button 10 are connected to the I/O interface 69 through a connector not shown to output to the ISA/EIO bus 63 signals corresponding to operation with respect to the stick type pointing device 5, the touch pad 33, the keyboard 4, or the shutter button 10. Further, the I/O interface 69 controls reception and delivery of data with respect to equipment connected, through the IEEE1394 port 101. Further, a power lamp PL, a battery lamp BL, a message lamp ML, and lamps formed from the power control circuit 73 and other LED are connected to the I/O interface 69.

The power control circuit 73 is connected to a housed battery 74 or an AC power supply to supply necessary power to respective blocks and controls charging of the housed battery 74 or a second battery of peripheral equipment. The I/O interface 69 monitors a power switch 40 operated when power is turned on or off.

The I/O interface 69 executes the IEEE1394 interface program 70A to the wake-up program 70E by the power supply provided therein even in a state that power is off. That is, the IEEE1394 interface program 70A to the wake-up program 70E are always operating.

Figure 8:
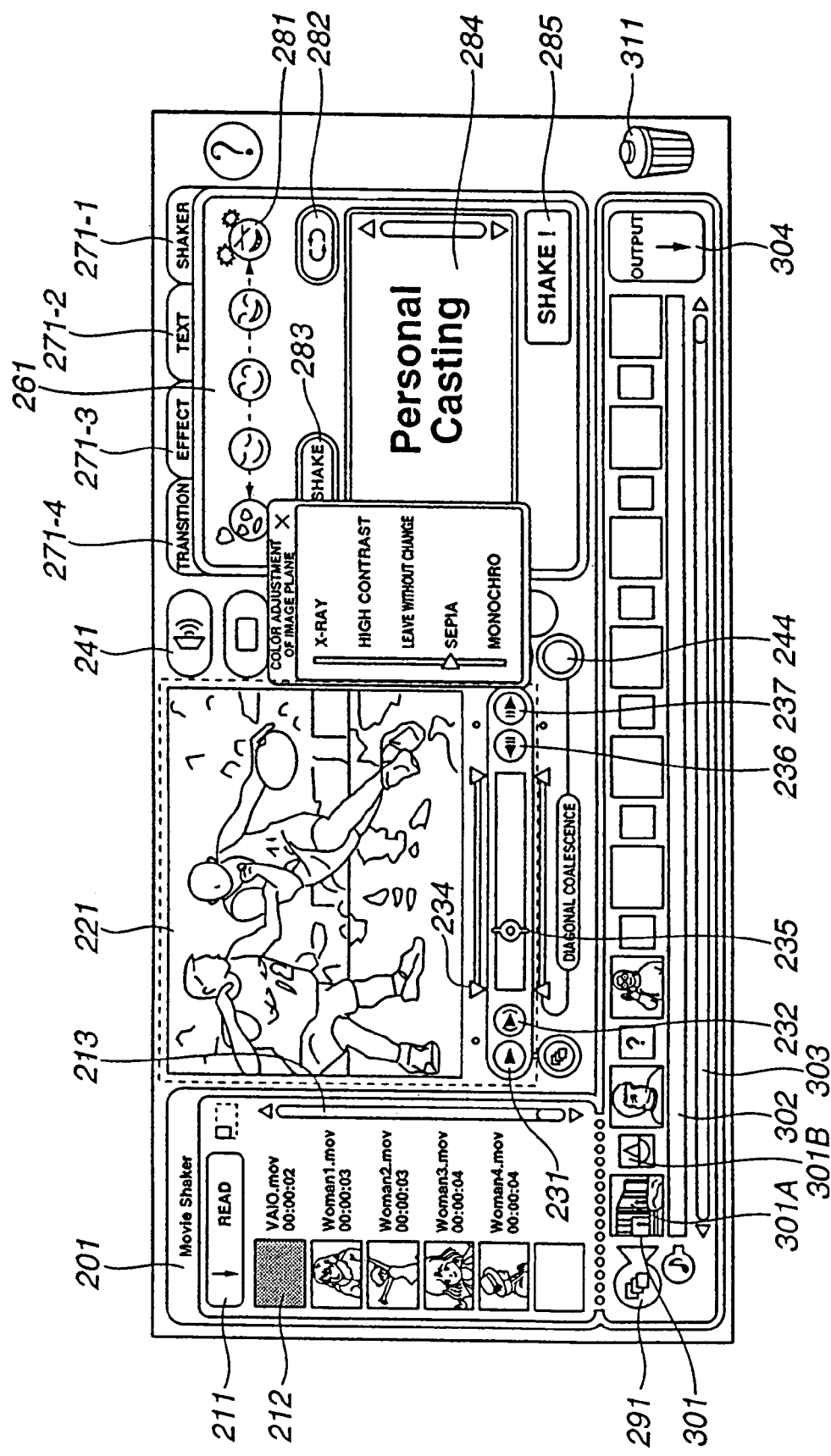
FIG. 8 is a view showing a display example of LCD provided on the personal computer shown in FIG. 1.
Figure 9:
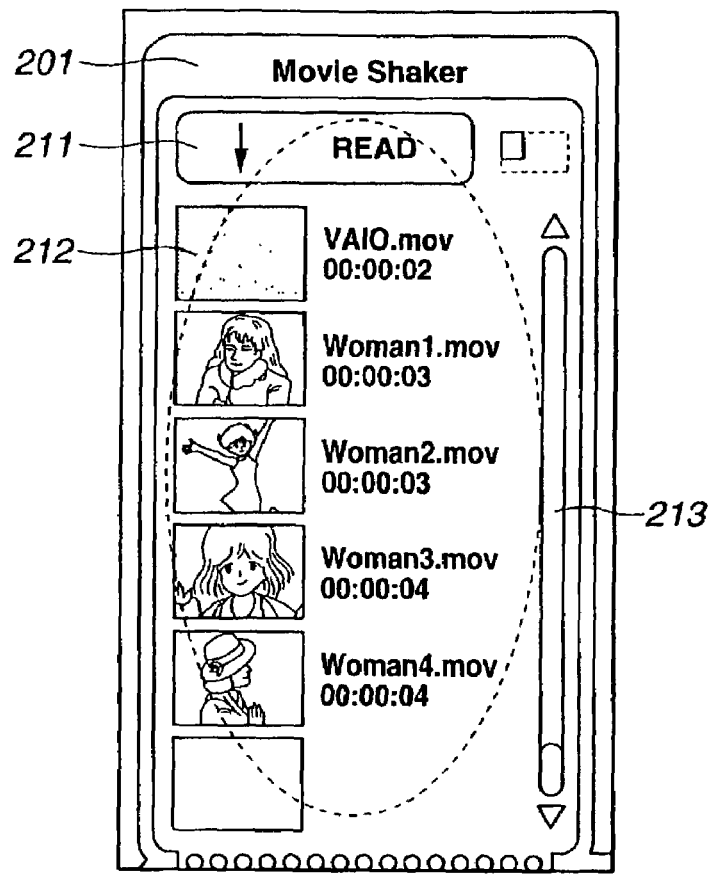
FIG. 9 is a view showing a display example of a portion of a material tray shown in FIG. 8.

FIG. 8 represents a display example of an image displayed on LCD 21 when a shaker program 54D is started. As shown in FIG. 8, a material tray 201 is at the left upper part of an image plane. A read button 211 is displayed on the material tray 201. The read button 211 is operated by a user when the user attempts to read information as an editing object in a case where the user attempts to edit predetermined image information. This operation is carried out by operating a stick type pointing device 5. The material tray 201 is shown in an enlarged scale in FIG. 9.

Figure 10:
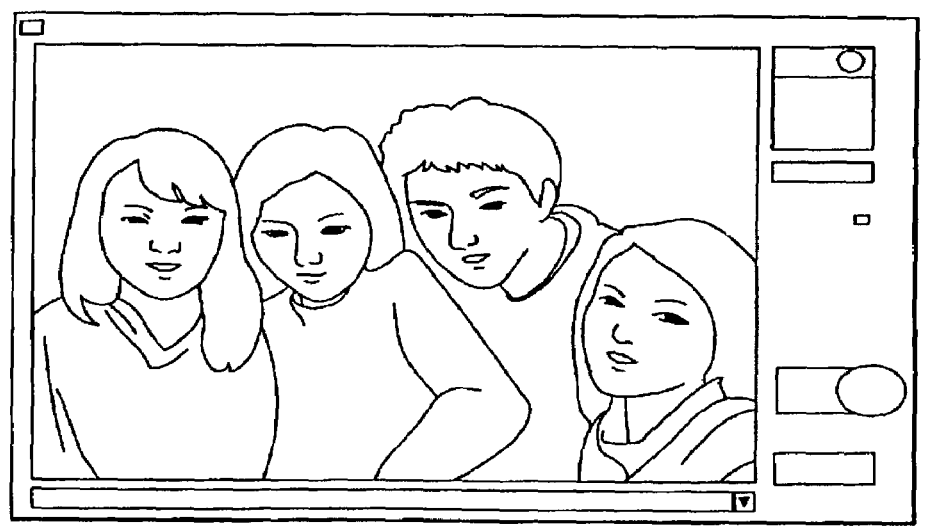
FIG. 10 is a view showing a display example of an image taken from a CCD video camera shown in FIG. 7.

For example, when a user starts a capture program 54E, a video controller 57 outputs an image picked up by a CCD video camera 23 to LCD 21 and displays it. FIG. 10 represents an example of an image displayed in a manner as described.

When a user operates a shutter button 10 in a predetermined timing, a video controller 57 supplies and stores stationary image or animation data displayed on an LCD 21 at that time. The image data is supplied from a RAM 54 to a hard disk 67 and stored as necessary.

The user reads the image data stored in the RAM 54 or the hard disk 67 as described above and operates a read button 211 to enable storing the image data in the RAM 54 as a material clip which is an image of the editing object. The image data placed in a shake object as described is displayed as a material clip 212 on the material tray 201. As shown in an enlarged scale in FIG. 9, on the right side of the material clip 212 are displayed a title of the material clip, a distinction between animation and a stationary image, and reproducing time. A scroll bar 213 is operated by a user when the material clip 212 is scrolled in a case where the number of material clips 212 increases so that all of them cannot be displayed in the range of the material tray 201.

The files capable of being material clips as objects of edition can be animations having an extension such as .MOV and .AVI, stationary images having an extension such as .BMP, .GIF, .JPG, .PNG and PCT or music having an extension such as .WAV and .AIF.

On the right side of the material tray 201 is displayed a reproducing image plane 221 as shown in FIG. 8. By the user, when a stick type pointing device 5 is operated, predetermined one out of the material clips 212 displayed on the material tray 201 is designated, and a reproducing button 231 is operated, the designated image is reproduced and displayed on the reproducing image plane 221. At this time, as reproducing progresses, a reproducing position display button 235 moves in its display position from left to right according to the reproducing position.

Figure 12:
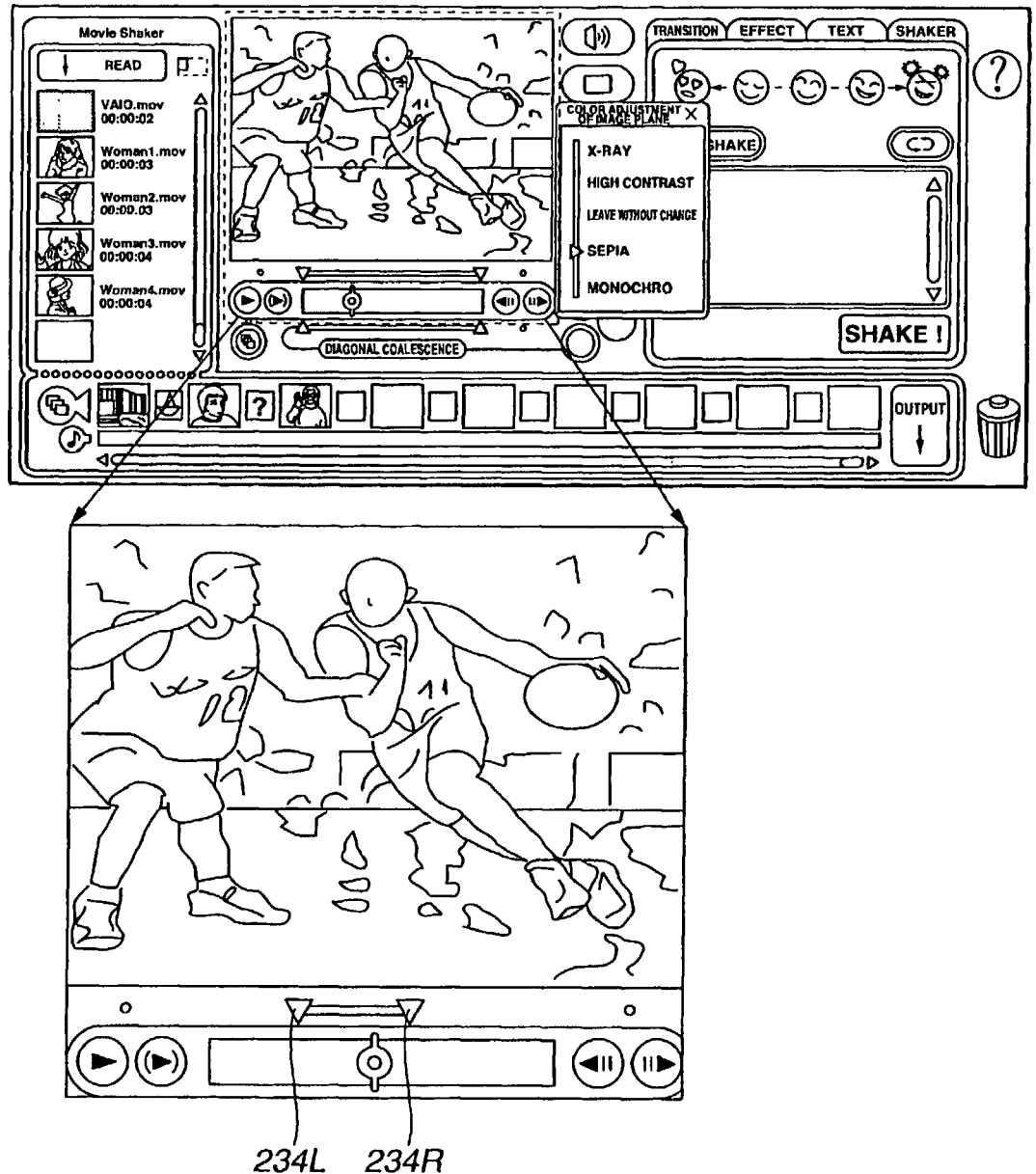
FIG. 12 is a view showing an example of trimming of a reproduced image plane shown in FIG. 8.

Also as shown in FIG. 12, a start point is designated by a pointer 234L, and a termination point is designated by a pointer 234R whereby a predetermined range of an animation image can be subject to trimming. In a case where trimming is done, only the image data subjected to trimming will be an image for a substantial editing object.

When a designation range reproducing button 232 is operated, only the range subjected to trimming as described is displayed on a reproducing image plane 221. In a case where a rewinding button 236 is operated, a display image on he reproducing image plane 221 is rewound and displayed in a direction from new image to an old image by time. In a case where a quick traverse button 237 is operate, an image displayed on the reproducing image plane 221 is quick-traversed.

When a mode button 233 is operated in a state of a story reproducing mode, the mode is changed to an editing mode, and when the mode button 233 is operated in a state of the editing mode, the mode is changed to the story reproducing mode.

In the editing mode, for example, when a reproducing button 231 is operated, a material clip 212 designated out of a material tray 201 at that time is displayed on a reproducing image plane 221, but in a state that the story reproducing mode is set, when the reproducing button 231 is operated, it is displayed on an output tray 291 as described later. A story (scenario) edited automatically or manually is reproduced from the beginning to the end.

Figure 13:
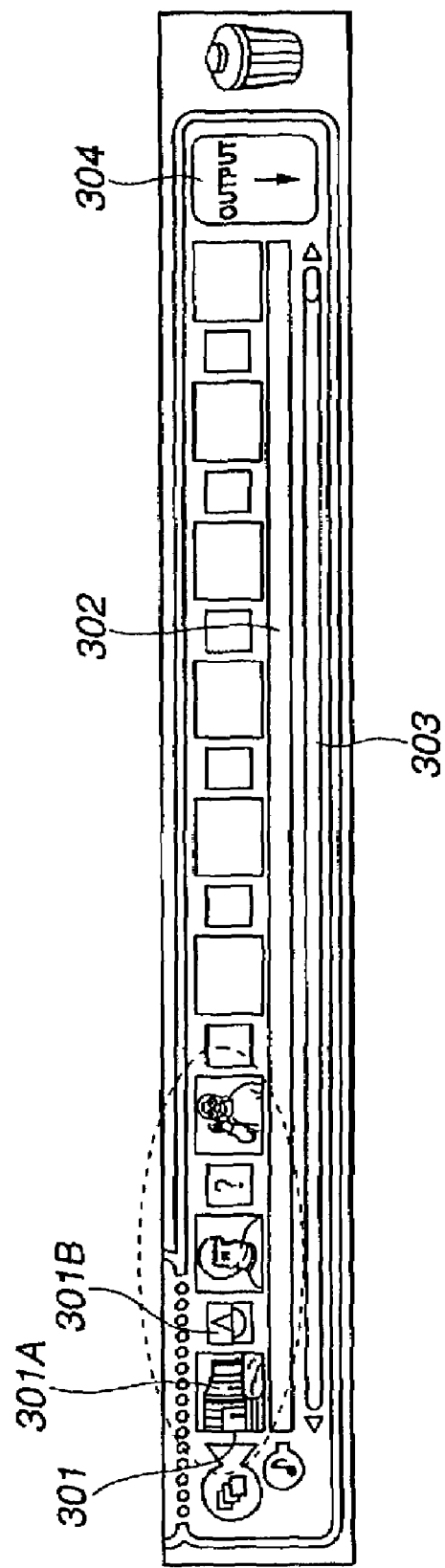
FIG. 13 is a view for explaining rearrangement of a clip of an output tray shown in FIG. 8.

When the editing process is carried out manually instead of automatically, a user selects a predetermined one out of material clips 212 displayed on the material tray 201, and gets drag and drop to a suitable position of a plurality of image display parts 301A on an image truck 301 shown in FIG. 13 to thereby prepare a scenario of a story as desired. The image as a material clip once subjected to drag and drop to the predetermined image display part 301A can be moved by further getting drag and drop on the image display part 301A at the other position.

In a case where a music file is present on the material tray 201, a user gets drag and drop a material clip 212 designated by an icon of the music file to a BGM truck 302 on an output tray 291 to enable voice thereof to correspond as BGM. The length assigned with music information on the BGM truck 302 corresponds to that of music information. Accordingly, in a case where the length of the music information is short, separate music information is subjected to drag and drop on the BGM truck 302 to thereby assign information.

Figure 14:
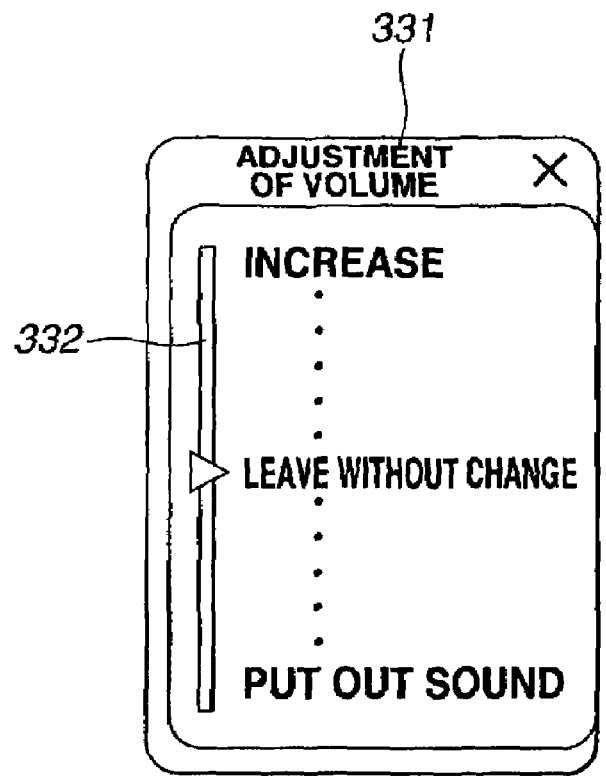
FIG. 14 is a view showing a display example of windows in a case where a volume button shown in FIG. 8 is operated.

On the right side of the reproducing image plane 221 are displayed a volume button 241, a color tone button 242, and a reproducing speed button 243. When the volume button 241 is operated, a window 331 as shown in FIG. 14 is displayed under the volume button 241. The user operates an adjusting br 332 whereby the volume at the time of outputting voice as an editing object can be adjusted.

Figure 15:
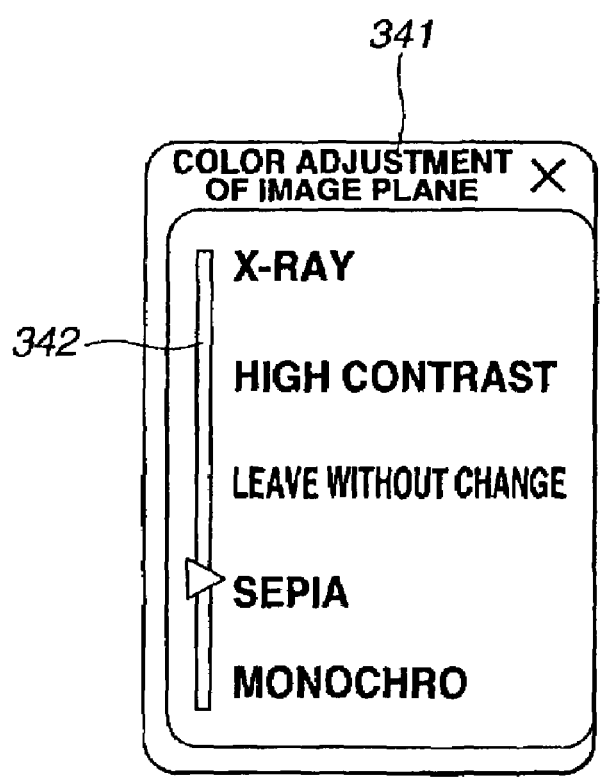
FIG. 15 is a view showing a display example of windows in a case where a color tone button shown in FIG. 8 is operated.

When the color tone button 242 is operated, a window 341 as shown in FIG. 15 is displayed under the color tone button 242. In this example, the user operates an adjusting bar 342 to thereby enable selection of either color tone out of X-ray, high contrast, leave without change, sepia or monochrome.

Figure 16:
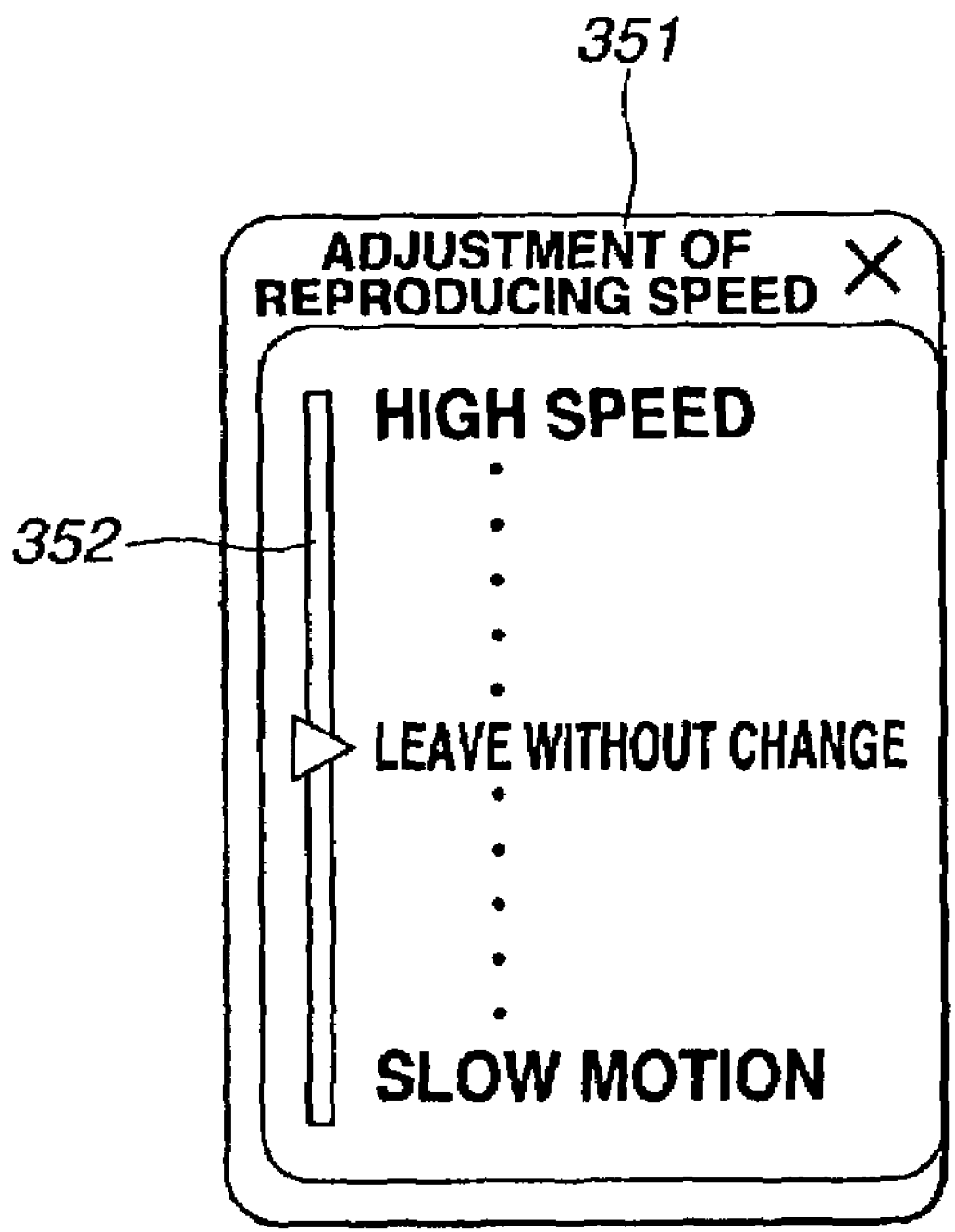
FIG. 16 is a view showing a display example of windows in a case where a reproducing speed button shown in FIG. 8 is operated.

When the reproducing speed button 243 is operated, a window 351 as shown in FIG. 16 is displayed under the reproducing speed button 243. The user operates an adjusting bar 352 to thereby enable adjustment such that the reproducing speed of an image is quickened or made slow.

An effect display button 244 is displayed under the reproducing speed button 243. The user gets drag and drop a selection button icon 364 displayed in FIG. 17 described later or a selection button icon 364 displayed in FIG. 17 described later a selection button icon 362 displayed in FIG. 18 to the effect display button 244 to thereby enable designation of the effect to a material displayed on a reproducing image plane 221.

On the right side of the volume button 241 to the effect display button 244 is displayed a special effect tray 261. Tags 271-1 to 271-4 are displayed on the special effect tray 261.

When the tag 271-2 is displayed, a text window is displayed as shown in FIG, 17. An image 361 as an editing object is displayed on the window. A font button 362 is operated when a font of a text for imparting an effect is selected. A text input when a user operates the keyboard 4 is displayed on a text input window 363. A selection button icon 364 is operated when an effect added to a text (a row of letters or characters) is selected. A scroll bar 365 is operated when the selection button icon 364 is scrolled.

A predetermined one out of the selection button icons 364 is subjected to drag and drop on the effect display button 244 to thereby enable addition of a text input and displayed at that time, for example, a text animation to the text input window 363. When the reproducing button 231 is operated after the selection button icon 364 has been subjected to drag and drop on the effect display button 244, an image having the selected text effect added is displayed immediately on the reproducing image plane 221. In this manner, the user is possible to confirm the text effect at real time.

Figure 17:
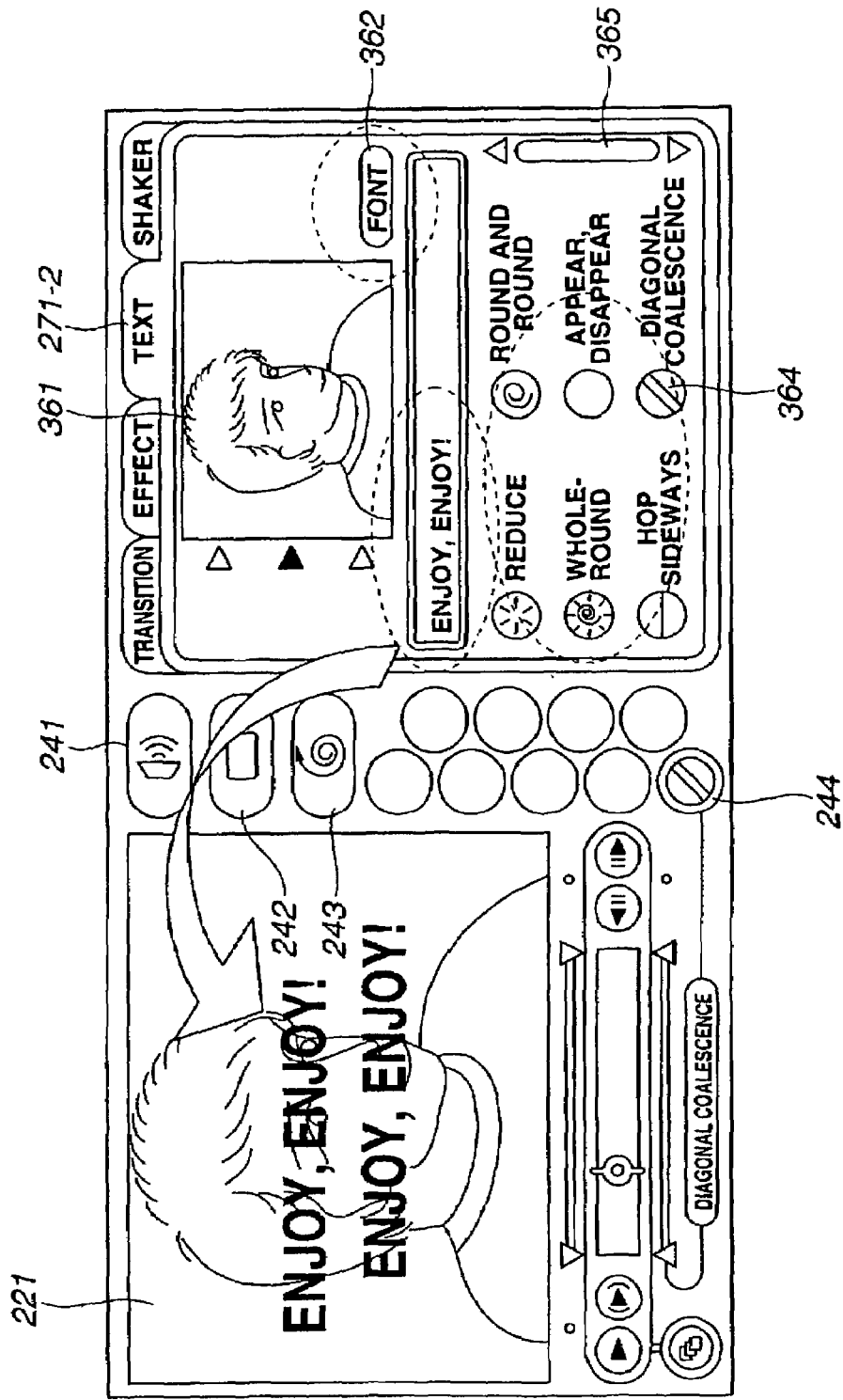
FIG. 17 is a view showing a display example of text windows of a special effect tray shown in FIG. 8.

In the FIG. 17 example, a text animation of "diagonal coalescence" is displayed on the reproducing image plane 221.

Figure 18:
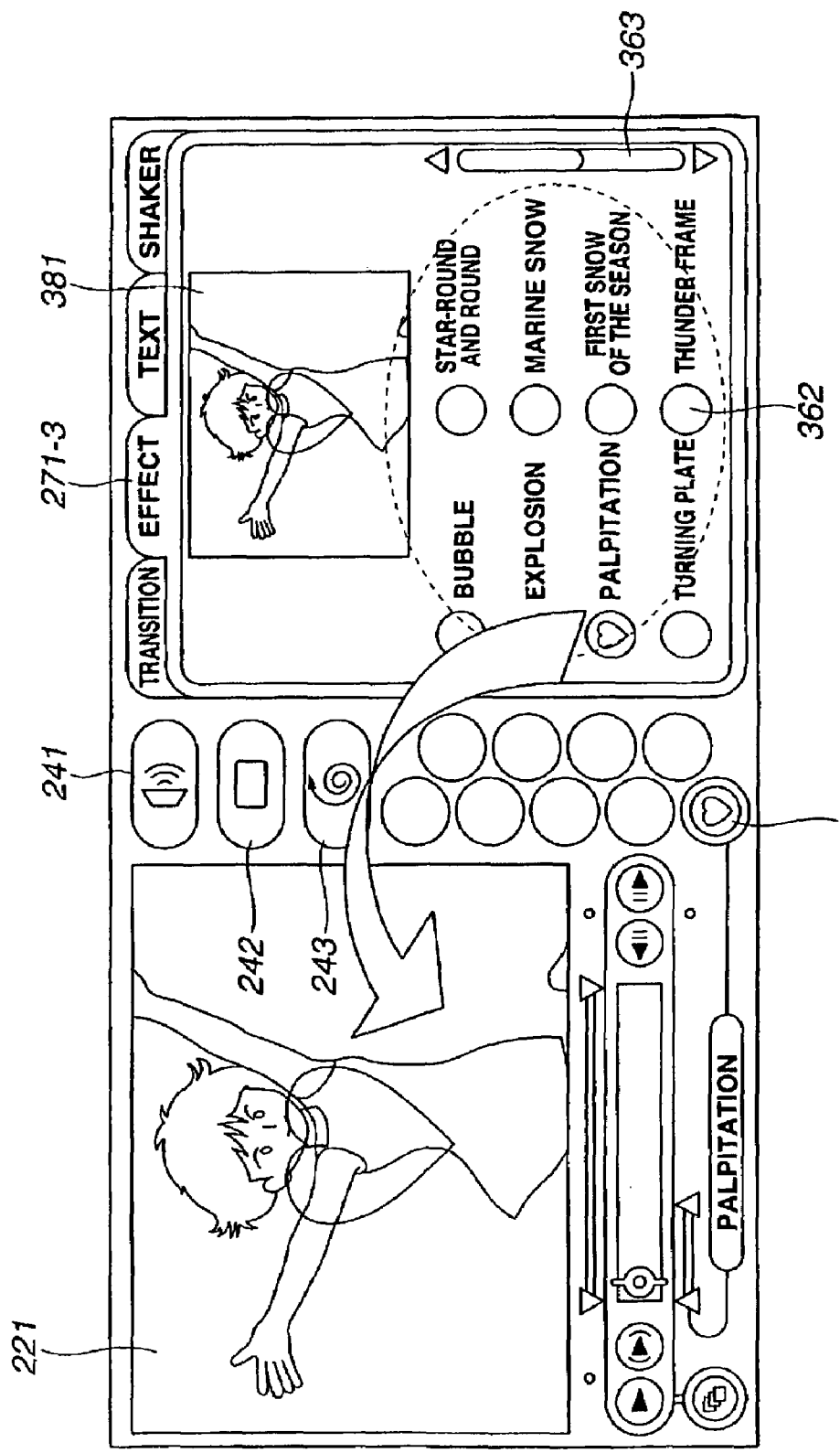
FIG. 18 is a view showing a display example of effect windows of a special effect tray shown in FIG. 8.

FIG. 18 represents a display example in a case where the tag 271-3 is selected. When this tag 271-3 is selected, an effect window is displayed as shown in the figure. On the window, an image 381 as an editing object is displayed, and a selection button iron 362 for selecting an animation effect is displayed thereunder. A scroll bar 363 is operated when the selection button icon 362 is scrolled.

Also in this case, a predetermined one out of the selection button icons 362 is subjected to drag and drop on the effect display button 244 to thereby enable selection of a predetermined animation effect. When the reproducing button 231 is operated after the selection has been made, an image having the animation effect added is displayed on the reproducing image plane 221 at real time. In the FIG. 18 example, an animation effect of "palpitation" is displayed.

Figure 19:
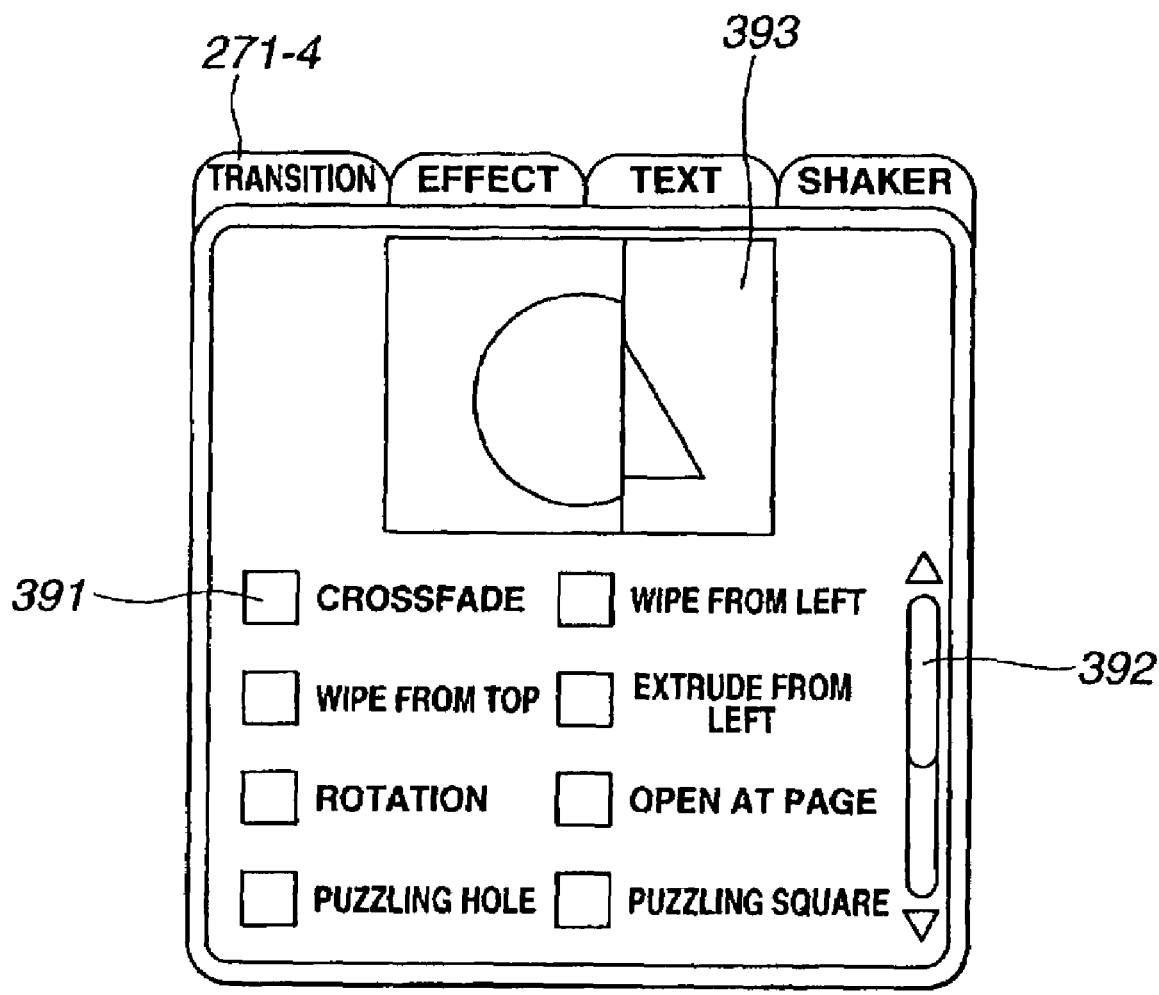
FIG. 19 is a view showing a display example of transition windows of a special effect tray shown in FIG. 8.

FIG. 19 represents a display example in a case where the tag 271-4 is selected. In this case, a transition window is displayed as shown in the figure. A selection button icon 391 is displayed on the window, and a user is able to select a predetermined one out of a plurality of selection button icons 391. In a case where this selection is done, a schematic image corresponding to the selected transition is displayed on a display part 393. In a case where a scroll bar 392 is operated, the selection button icon 391 is scrolled.

Figure 20:
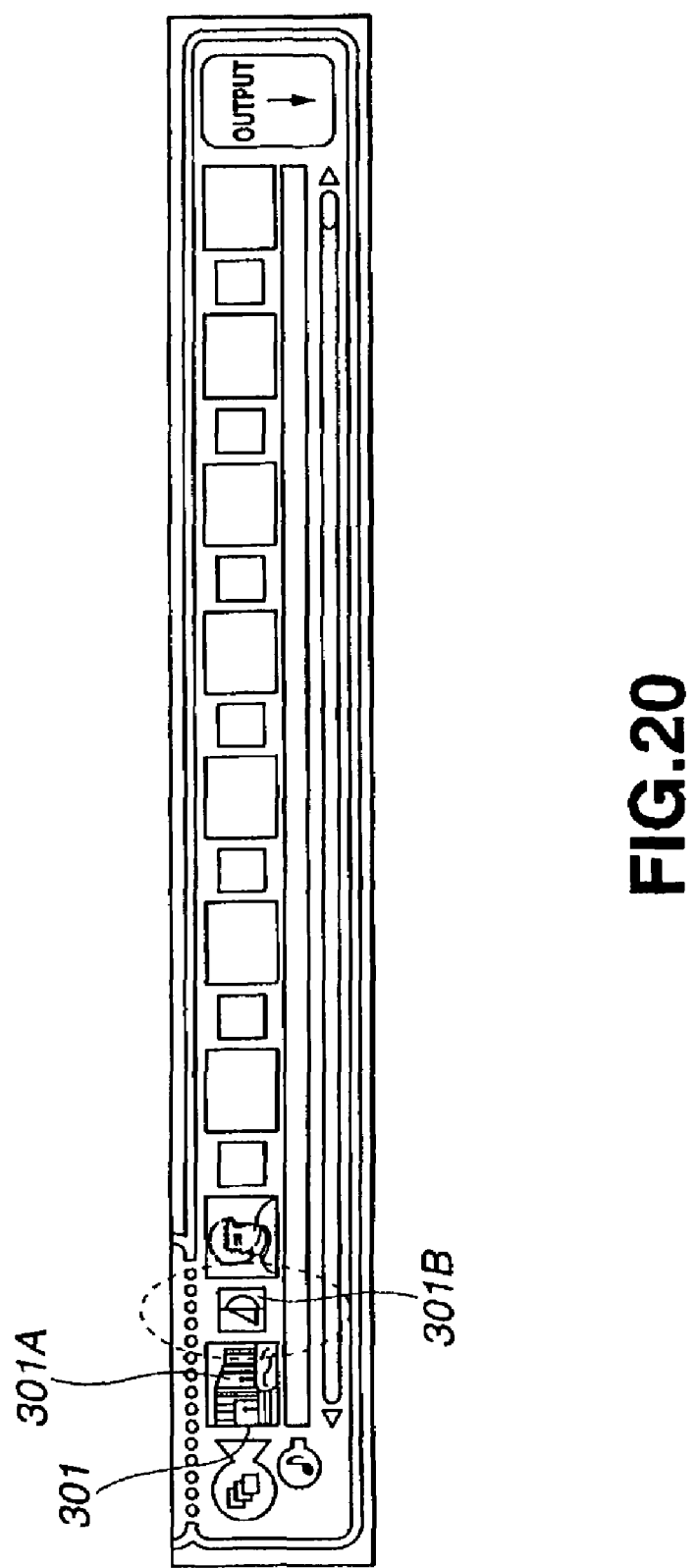
FIG. 20 is a view showing a display example in a case where transition of an output tray shown in FIG. 8 is applied.

The user gets, after the predetermined selection button icon 391 has been selected, drag and drop to a transition display part 301B of an image truck 301 shown in FIG. 20 to enable addition of transition to an image (material clip) displayed on an image display part 301A adjacent to the before and behind.

Figure 21:
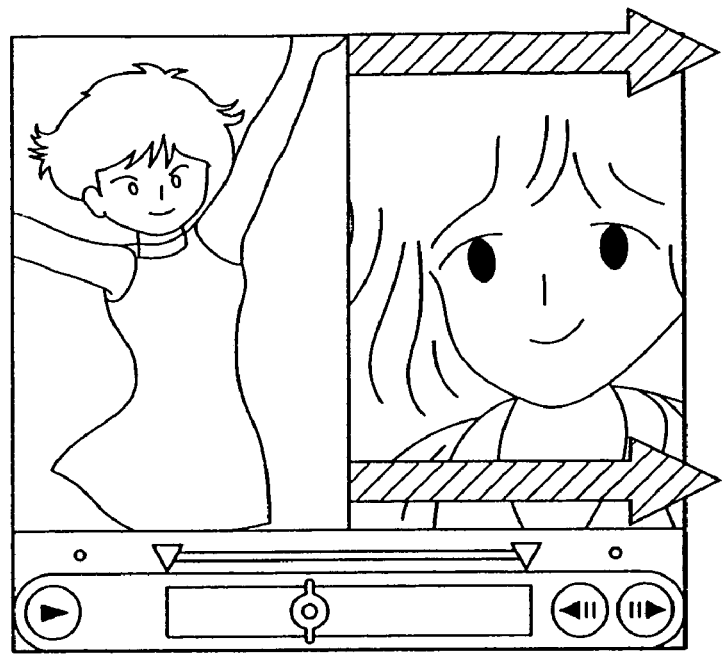
FIG. 21 is a view showing a display example for explaining a wipe effect.

For example, in a case where transition of the wipe is set, the transition is carried out while the image displayed on the left side in the figure is moving gradually rightward so to gradually hide the image displayed on the right side as shown in FIG. 21.

Figure 22:
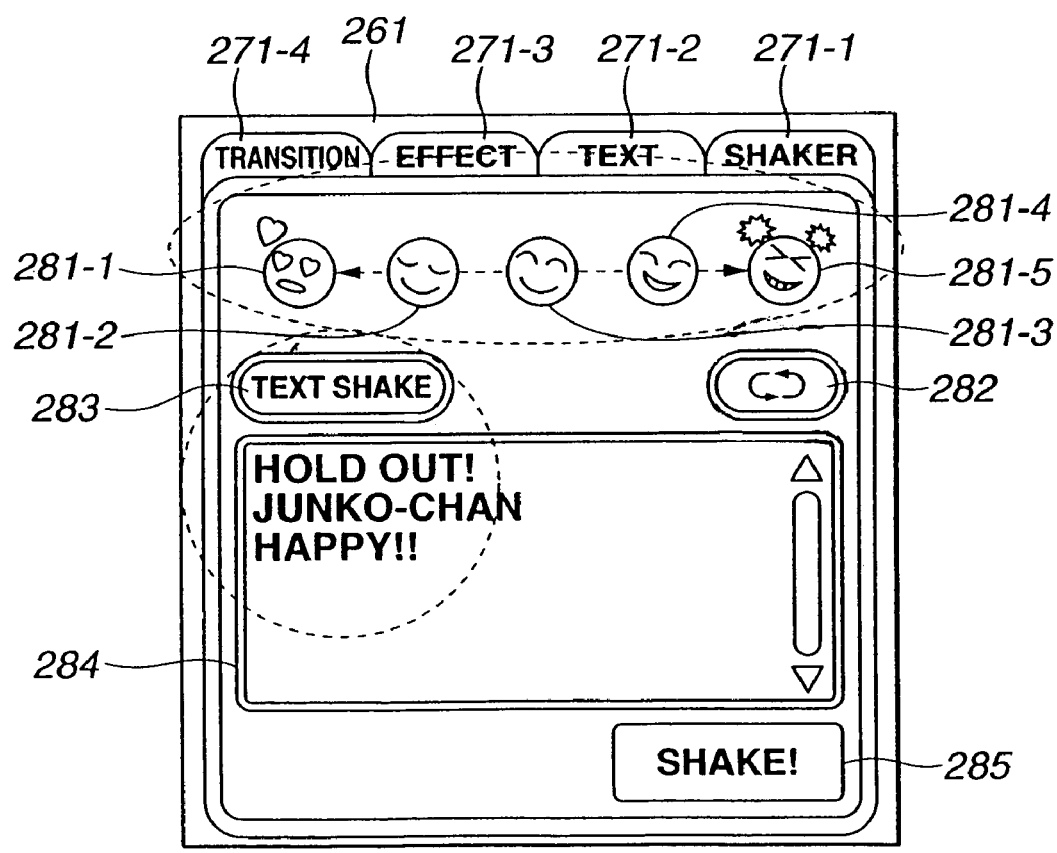
FIG. 22 is a view showing a display example of shaker windows of a special effect tray shown in FIG. 8.

When the tag 271-1 is selected, a shaker window for automatic edition is displayed as shown in an enlarged scale in FIG. 22. Selection buttons 281-1 to 281-5 are displayed on the shaker window. A predetermined scenario of a story is corresponded in advance to the selection buttons 281-1 to 281-5. A preset predetermined music is corresponded to each scenario, and the music corresponding to the selection button 281-1 on the leftmost side in FIG. 22 is slowest in tempo, and the music corresponding to the selection button 281-5 on the rightmost side is quickest and severe. The music corresponding to the selection buttons 281-2 to 281-4 therebetween are respectively music of an intermediate tempo.

Concretely, ambient music (environmental music), piano music, jazz music, hip-hop music, and techno-tone music are corresponded to the selection button 281-1, the selection button 281-2, the selection button 281-3, the selection button 2814 and the selection button 281-5, respectively.

Accordingly, the number of scenes constituting a scenario corresponding to the selection button 281-1 corresponding to these music is a relatively few (the change number of scenes is a few). On the other hand, scenario corresponding to the selection button 281-5 is many in the scene number (the change times of scenes is many). The lengths of scenario corresponding to the selection buttons 281-1 to 281-5 are all the same, which is 30 seconds in this example.

A loop button 282 is operated by a user, supposing that when a scenario of 30 seconds produced by automatic edition is respectively reproduced. A text shake button 283 is operated by a user when a text (letter) is shaken. When the text shake button 283 is operated, a window 284 is displayed, and the user operates the keyboard 4 to enable input of a row of letters as an editing object into the window 284. In this example, three rows of letters, "Hold out!", "Junk-chan" and "Happy!!" are input and displayed.

A shake button 285 is operated by a user when the shake (automatic edition) is started.

Figures 23, 24:
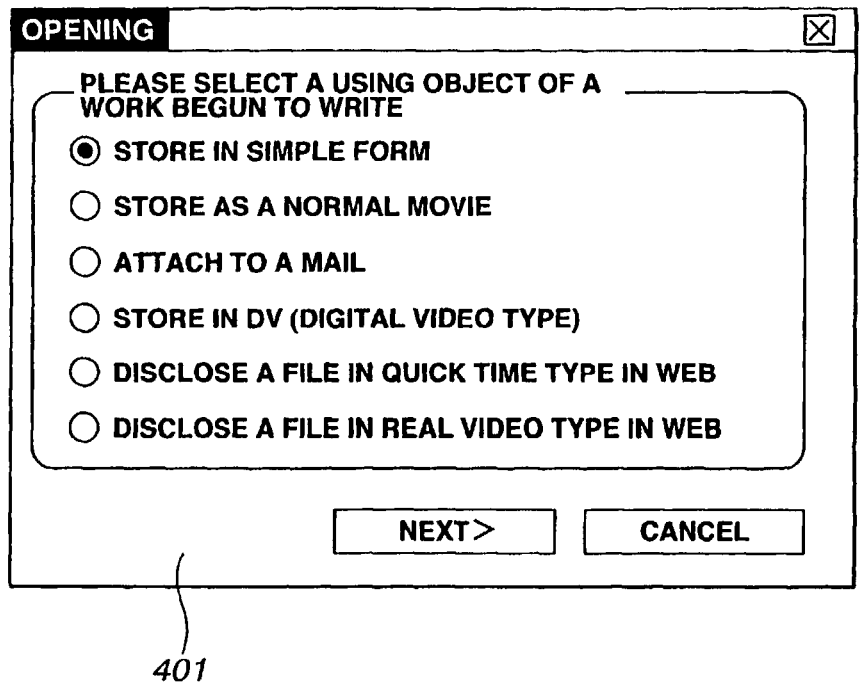
FIG. 23 is a view showing a display example of windows in a case where an output button shown in FIG. 8 is operated.
FIG. 24 is a view showing an example of editing information of a simple storage.

When an output button 304 is operated, a window 401 as shown in FIG. 23 is displayed. The user selects the desired item from the window 401. Thereby, the form of storage of information displayed on the output tray 291 (edited manually or automatically) can be selected. In a case, for example, "Store in simple form" is selected, a file including an image used and editing information of the image are stored. The editing information termed hereupon is, for example, information as shown in FIG. 24. In FIG. 24, the frame number on the leftmost side represents the timing at which each scene constituting its scenario begins. In the FIG. 24 example, a scenario is constituted by 10 scenes, and the first scene begins from the $6^{th}$ frame.

The next animation effect represents a process of animation effect corresponded to its scene. Since as the animation effect, 20 effects are prepared, values 0 to 19 represent its effect, and the value 99 represents that the animation effect is not applied. Further, the value −1 represents that a predetermined one is selected from 20 animation effects at random.

The next transition represents which transition out of 8 transitions is. The value 99 represents that the transition is not applied. Further, the next transition represents the timing of transition.

The color tone effect represents which values of 0 to 23 are out of 24 kinds of color tones. The value −1 represents that a predetermined one is selected at random out of 24 kinds of color tones. The value 99 represents that effect of color tone is not applied.

The last value represents whether or not the black mat is used for the background. The value 1 represents that the black mat is used as the background, and the value 0 represents not being used.

On the other hand, in a case where "Store as a normal movie" shown in FIG. 23 is selected, editing information as shown in FIG. 24 is actually applied to an image assigned to each scene to actually produce (rendering) image data with such an effect given. Accordingly, this process takes long time as compared with the case of "Store in simple form". In other words, "Store in simple form" is selected to thereby enable making the storage time short.

Next, a shaker process (automatic editing process) will be described with reference to flowcharts of FIGS. 25A to 25C. The following process is basically executed by a shaker program 54D unless otherwise particularly not explained. First, in Step S1, a read process is executed with a designated file as a material clip. That is, as mentioned above, a user starts a capture program 54E to designate a predetermined one out of a file of image data introduced from a CCD video camera 23 and a file of voice data input from a microphone 24, and operates a read button 211 to designate the file as an object of an automatic editing process (material clip). When this designation process is carried out, the shaker program 54D stores the designated file as a material clip and processes an image of the first frame of the file to display it as a material clip 212 on a material tray 201. In a case where designated information is voice information, an image representing that is voice information prepared in advance is displayed.

It is noted that the thus incorporated information include not only that is incorporated from a CCD video camera 23 and a microphone 24, that is incorporated through a modem 75 from an Internet 80, and those which are incorporated through an interface card 112 from a magnetic disk 121, an optical disk 122, an optical magnetic disk 123, and a semiconductor memory 124.

Next, the procedure proceeds to Step S2. The shaker program 54D executes, if a text is input as a shake object, a process for incorporating the input text. That is, the user operates, when carrying out the automatic editing process, the tag 271-1 to display a shaker window (see FIG. 22). In a case where the text shake takes place, the user further operates a text shake button 283. Thereby, a window 284 is displayed as shown in FIG. 22. At that time, the user operates the key board 4 to input a text to be shaken. The shaker program 54D incorporates this text to display it on the window 284.

Further, the user designates one out of five shaker buttons 281-1 to 281-5. As mentioned above, respective predetermined scenarios are corresponded in advance to the shaker buttons 281-1 to 281-5, and the shaker button 281 is selected to thereby select its scenario. So, the shaker program 54D executes, when a predetermined one is designated out of the shaker buttons 281-1 to 281-5, process for storing it.

Figure 26A:
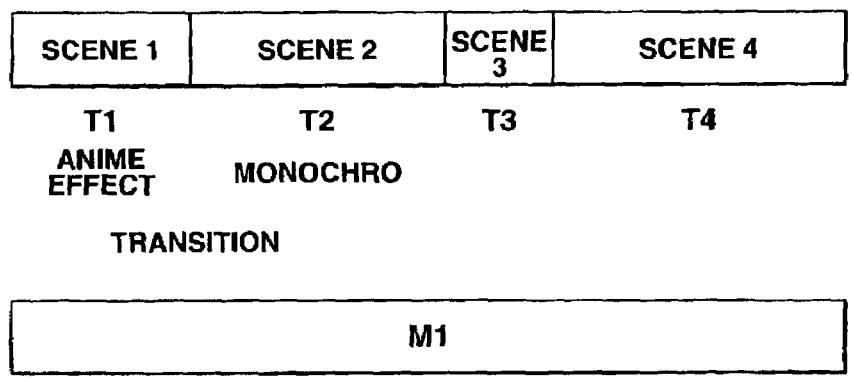
FIGS. 26A and 26B are respectively views for explaining the constitution of a scene.

For example, a scenario as shown in FIG. 26A is corresponded to the selection button 281-1. This scenario is constituted by four scenes, scenes 1 to 4. The scenes 1 to 4 have lengths of the times T1 to T4. In a case of this example, an animation effect is added to the scene 1, and monochromic color tone adjusting process is carried out for the scene 2. Transition is added between the scenes 1 and 2. Further, music M1 is corresponded to the scenario.

As will be described in detail later, the shaker program 54D selects a predetermined one out of image information of a material clip displayed on the material tray 201 at random to execute processes assigned to the scenes 1 to 4. As a result, the editing process along the scenario prepared in advance is automatically carried out by the shaker program 54D.

Figure 26B:
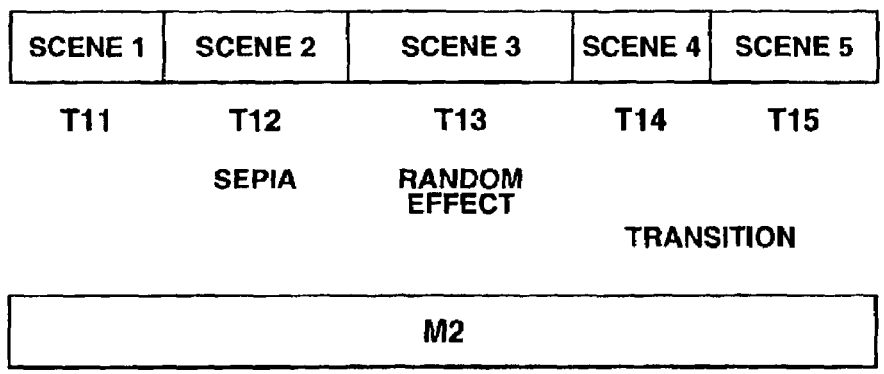

FIG. 26B represents a scenario corresponded to the selection button 281-2. This scenario is constituted by five scenes, scenes 1 to 5, lengths of which are T11 to T15, respectively. Sepia color, random effect, and transition are added to the scene 2, the scene 3, and between the scene 4 and the scene 5, respectively. Music is M2.

Though not shown, such a scenario is also corresponded to the selection buttons 281-3 to 281-5, and prepared in advance.

In Step S4, the shaker program 54D executes process storing after a loop is designated. That is, the user operates, supposing that a scenario obtained by editing is reproduced continuously repetitively, a loop button 282. When this operation is carried out, the shaker program 54D stores it in Step S4.

Figure 27A:
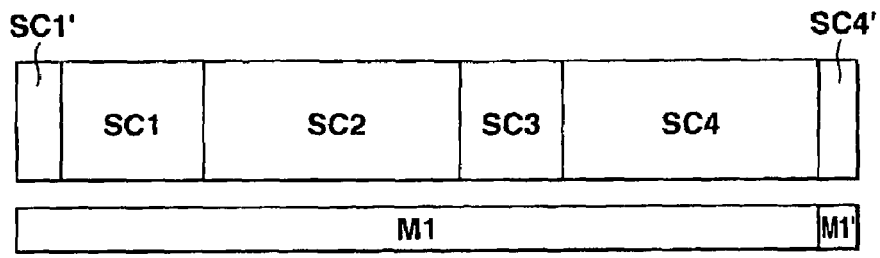
FIGS. 27A to 27D are respectively views for explaining the constitution of a scene with continuous repetitive reproducing as a premise.

For example, the scenario corresponding to the selection button 281-1 is basically constituted as shown in FIG. 26A, but the scene in a case where the loop button 22 is not operated is constituted, for example, as shown in FIG. 27A, more accurately. At this time, it is supposed that the scene is not reproduced continuously repetitively. That is, a fade-in portion SC1' is formed at the beginning of a scene 1 (SC1), and a fade-out portion SC4' is formed at the last scene 4 (SC4). Further, music M1 is also formed with a non-sound portion M1' at the last.

Figure 27B:
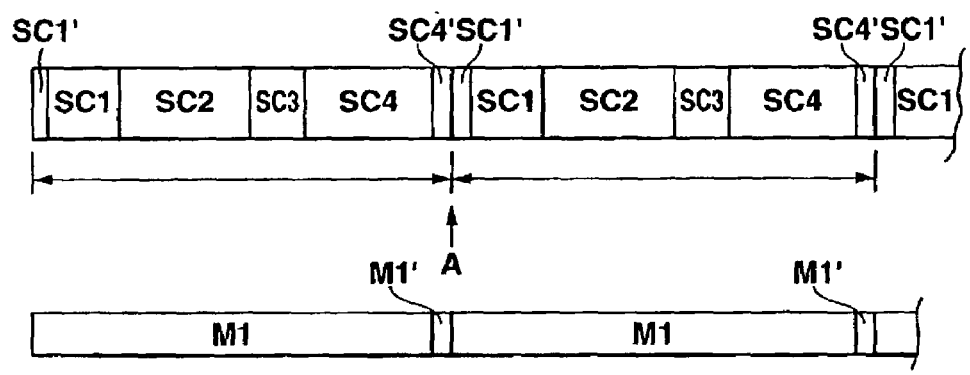

Accordingly, when information edited on the basis of the scenario constituted as shown in FIG. 27A dares to reproduce continuously repetitively, there becomes as shown in FIG. 27B. That is, reproducing is started by the fade-in portion SC1', and a scene 1, a scene 2, a scene 3, and a scene 4 are reproduced, after which the first reproducing is ended by the fade-out portion SC4'. Continuously, reproducing of an image of the fade-in scene SC1' is again started to reproduce a scene 1, a scene 2, a scene 3, and a scene 4, and the fade-out portion SC4' is again displayed. Also with respect to music, in a boundary portion A between the first reproducing and the second reproducing, the non-sound portion M1' is reproduced. Accordingly, a viewer is able to recognize easily that reproducing is once ended, in the boundary portion A.

Figure 27C:
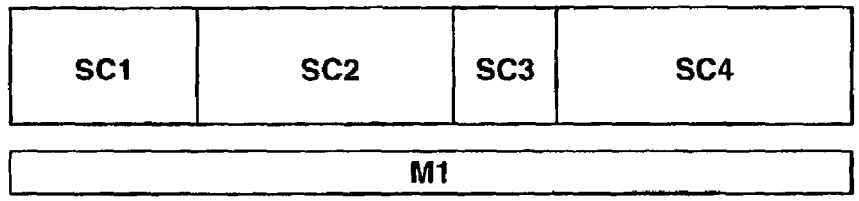

On the other hand, after the selection button 281-1 is selected, and in a case where the loop button 282 is also operated, a scenario as shown in FIG. 27C is selected.

This scenario is constituted by four scenes, a scene 1 to a scene 4, but the top of the scene 1 and the last of the scene 4 are constituted such that even if the scene 1 should be reproduced following the scene 4, for example, the scene changes similar to the timing of switching between the scene 1 and the scene 2, or the timing of switching between the scene 2 and the scene 3, or the timing of switching between the scene 3 and the scene 4, and recognition that one scenario is ended is not made. That is, it is constituted such that recognition may be made that an image plane is merely switched.

Likewise, it is constituted such that even if the music M1 should be again reproduced continuously following reproducing from the top to the end of the music M1, recognition that the scene is ended at that portion is not made.

Figure 27D:
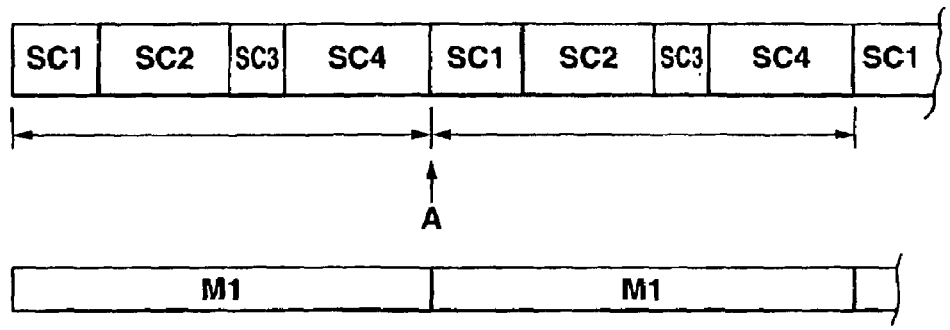

As a result, as shown in FIG. 27D, even if the scenes 1 to 4 should be again reproduced continuously following the scenes 1 to 4, there is less possibility that a viewer recognizes intuitively that the first reproducing is ended and the second reproducing is started in the boundary portion A.

As described above, the shaker program 54D has two scenarios, a scenario supposing of not being reproduced continuously repetitively, and a scenario supposing of being reproduced continuously repetitively, corresponding to the selection buttons 281-1 to 281-5. In a case where the loop button 282 is not operated, the former is selected, and in a case where the loop button 282 is operated, the latter is selected.

Next, in Step S5, the shaker program 54D judges whether or not the shaker button 285 is operated; in a case of not being operation, the step returns to Step S1, where thereafter processes are executed repetitively. In a case where judgement is made that the shake button 285 is operated, the step proceeds to Step S6, where the shaker program 54D judges whether or not a loop is designated, that is, judges whether or not the loop button 282 is operated. In a case where judgement is made that the loop is designated, the step proceeds to Step S7, where the shaker program 54D selects a scenario for a loop corresponding to that operated out of the selection buttons 281-1 to 281-5. On the other hand, in Step S6, in a case where judgement is made that the loop is not designated, the shaker program 54D selects, in Step S8, a scenario for a non-loop corresponding to that operated out of the selection buttons 281-1 to 281-5.

After the process of Step S7 or Step S8, the step proceeds to Step S9, where the shaker program 54D assigns ID (Identification Number) to respective material clips 212 displayed on the material tray 201. In Step S10, the shaker program 54D selects one of the material clips at the random number. In other words, one ID is selected at random out of IDs assigned in the process in Step S9 whereby one material clip is selected.

In Step S11, the shaker program 54D causes the material clip selected in the process in Step S10 to correspond to one scene (in this case, the first scene) out of the scenario selected in the process in Step S7 or Step S8.

In Step S12, judgement is made whether or not corresponding process of the material clips with respect to all the scenes are ended; in a case of not yet being ended, the step returns to Step S10, where thereafter processes are executed repetitively. In this manner, for example, the respective predetermined material clips are corresponded to the scene 1, the scene 2, the scene 3, and the scene 4 shown in FIG. 26A.

In Step S12, in a case where judgement is made that the corresponding process with respect to all the scenes is ended, the step proceeds to Step S13, where the shaker program 54D selects one scene. For example, hereupon, the head scene is selected. In Step S14, the shaker program 54D judges whether or not the length of the scene selected in Step S13 is shorter than that of the material clip corresponded to that scene. In a case where the length of the selected scene is shorter than that of the material clip corresponded, the step proceeds to Step S15, where the shaker program 54D decides a portion corresponded to a scene in the material clips at random number. For example, in a case where the length of the material clip is 5 seconds, and the length of the corresponding scene is 1 second, whether an image for which 1 second out of 5 seconds is corresponded to the scene is decided by generating numerals 1 to 5 at random number On the other hand, in a case where in Step S14, judgement is made that the length of a scene selected is not shorter than that of the material clip corresponded, the step proceeds to Step S16, where the shaker program 54D executes process for extending the length of the material clip so as to adjust to the length of the scene. For example, in a case where the length of the material clip is 1 second, and the length of the scene is 5 seconds, the length of the material clip is extended by five times (reproducing at the speed of ⅕ time), that is, slow motion reproducing is done whereby the length of the material clip is corresponded to the length of the scene.

After the process of Step S15 or Step S16, the step proceeds to Step S17, where the shaker program 54D judges whether or not effect is designated to the scene in that scenario. For example, in a case where now, a scene as a process object is a scene 1 in FIG. 26A, animation effect is designated to the scene 1. In such a case, the step proceeds to Step S18, where the shaker program 54D judges whether or not the effect is decided. That is, designation of effect includes a case where effect is already decided such that effect is animation effect as in a case of the scene 1 of FIG. 26A, and a case where effect is designated as random effect as in a case of the scene 3 of FIG. 26B, for example. In a case of the random effect, addition of effect is determined, but what effect is applied is not yet decided. Accordingly, in such a case, the step proceeds to Step S19, where the shaker program 54D is prepared in advance. For example, the random number is generated out of 24 effects to decide one effect.

In a case where in Step S18, judgement is made that effect is already decided, or in a case where in Step S19, effect is decided, the step proceeds to Step S20, where the shaker program 54D causes the decided effect to correspond to the material clip corresponded to the scene.

In a case where in Step S17, judgement is made that effect is not designated to a scene, the processes of Step S18 to Step S20 are unnecessary, which steps are therefore omitted.

Next, in Step S21, the shaker program 54D judges whether or not transition is designated. In a case where transition is designated, the step proceeds to Step S22, where the shaker program 54D sets transition between the next material clips. Thereby, for example, when an image plane of a scene as a process object at present is switched to that of a scene to be a process object next, wipe effect as shown, for example, in FIG. 21 is given to switch an image plane.

In a case where in Step S21, judgement is made that no designation of transition is present, the process of Step S22 is unnecessary, which is therefore skipped.

In Step S23, the shaker program 54D judges whether or not text is incorporated. That is, as described above, in a case where text shake is carried out, a text as an object thereof is incorporated in Step S2. In this case, the step proceeds to Step S24, where the shaker program 54D decides whether or not text is shaken in a scene as a process object now is decided at random. In Step S25, the shaker program 54D judges whether or not the text shake is done; in a case where judgement is made that the text shake is done, the step proceeds to Step S26, where one text is selected at random out of texts incorporated. For example, in a case where three texts are incorporated as shown in FIG. 22, one text out of them is selected to be corresponded to the scene to be a process object now.

Next, in Step S27, the shaker program 54D decides insert positions of a text at random. In a case of this example, the insert positions of a text are five positions, centre, right above, left above, left below, and right below, and one position is decided at random out of these five positions.

In a case where in Step S25, judgement is made that no text shake is done, processes of Step S26 and Step S27 are skipped. Further, in a case where in Step S23, judgement is made that no text is incorporated, processes of Step S24 to Step S27 are skipped.

Next, in Step S28, judgement is made whether or not the process with respect to all the scenes is ended; and in a case where the process with respect to all the scenes is not ended, the step returns to Step S13, where the process similar to the aforementioned case is executed with respect to next scene.

In a case where in Step S28, judgement is made that the process with respect to all the scenes is ended, the step proceeds to Step S29, where the shaker program 54D causes an image corresponding to the edited scenario to be displayed on an image truck 301 of an output tray 291. At this time, an image of a frame at the head of each scene is displayed on an image display part 301A of the image truck 301, and in a case where transition is present, an image corresponding to the transition (see FIG. 19) is displayed on a transition display part 301B.

The above-described processes will be schematically explained with reference to FIG. 28.

That is, in a case of this example, as material clips, material clips CL1 to CL5 are designated. One scenario is decided by operation of a selection button 281 designated by a user. In a case of this example, this scenario is constituted by n numbers of scenes, scenes SC1 to SCn. Out of them, the scene SC3 is subjected to color tone adjustment of sepia color, the random effect is given to the scene $SC_{n-1}$, and the scene $SC_n$ is subjected to color adjustment of sepia color. Transitions are respectively formed between the scenes SC2 and SC3, between the scenes SC3 and SC4, and between the scene $SC_{n-1}$ and the scene $SC_n$. The length of the scene SC1 is 2 seconds, the length of the scene SC2 is 2.2 seconds, the length of the scene SC3 is 4.0 seconds, the length of the scene $SC_{n-3}$ is 1 second, the length of the scene $SC_{n-1}$ is 5 seconds, and the length of the scene $SC_n$ is 3 seconds. Further, music corresponding to the scene is decided in advance. These are already prepared in advance by the shaker program 54D.

On the other hand, the shaker program 54D selects a predetermined one out of five material clips CL1 to CL5 at random to assign it to each scene SC1 to $SC_n$. And, for example, in a case where the material clip CL5 is assigned to the scene $SC_{n-3}$, the length of the scene $SC_{n-3}$ is 1 second while the length of the material clip CL5 is not less than 1 second. So, in this case, out of the reproducing tine of the material clip CL5, t1 to t4, a portion of the length of 1 second from the time t2 to t3 selected at random is assigned to the scene $SC_{n-3}$.

In such a manner as described above, the user merely designates a material clip to thereby enable obtaining image information subjected to predetermined editing process automatically. Since the designation of element clips is decided at random, even if one and the same material clip is selected, a different editing result is basically to be obtained.

When in the state that the editing result is displayed on the output tray 291, the reproducing button 231 is operated, the shaker program 54D causes the image corresponding to the edited scenario (which is obtained by modifying a scenario prepared in advance) to be displayed on the reproducing image plane 221. The user is able to confirm the editing result thereby.

When the user operates the output button 304 after confirmation in the reproducing image plane, the window 401 as shown in FIG. 23 is displayed. The user selects a predetermined item out of items displayed on the window 401 to thereby enable storing information obtained as a result of edition in a predetermined form.

In a case where "Store as a normal movie" is selected, the shaker program 54D actually applies editing information to the selected material clip to execute the rendering process. As a result, for example, an image with a predetermined result is formed, and the image is stored in a designated storage medium, for example, the hard disk 67.

However, it takes relatively long time to execute the rendering process. On the other hand, in a case where "Store in simple form" is selected, the actual rendering process is not executed, but a file of the material clip selected as an editing object and editing formation, for example, information as shown in FIG. 24, is stored. Accordingly, the storing process can be completed in a short period of time as compared with the case where the rendering process takes place.

Figure 25A:
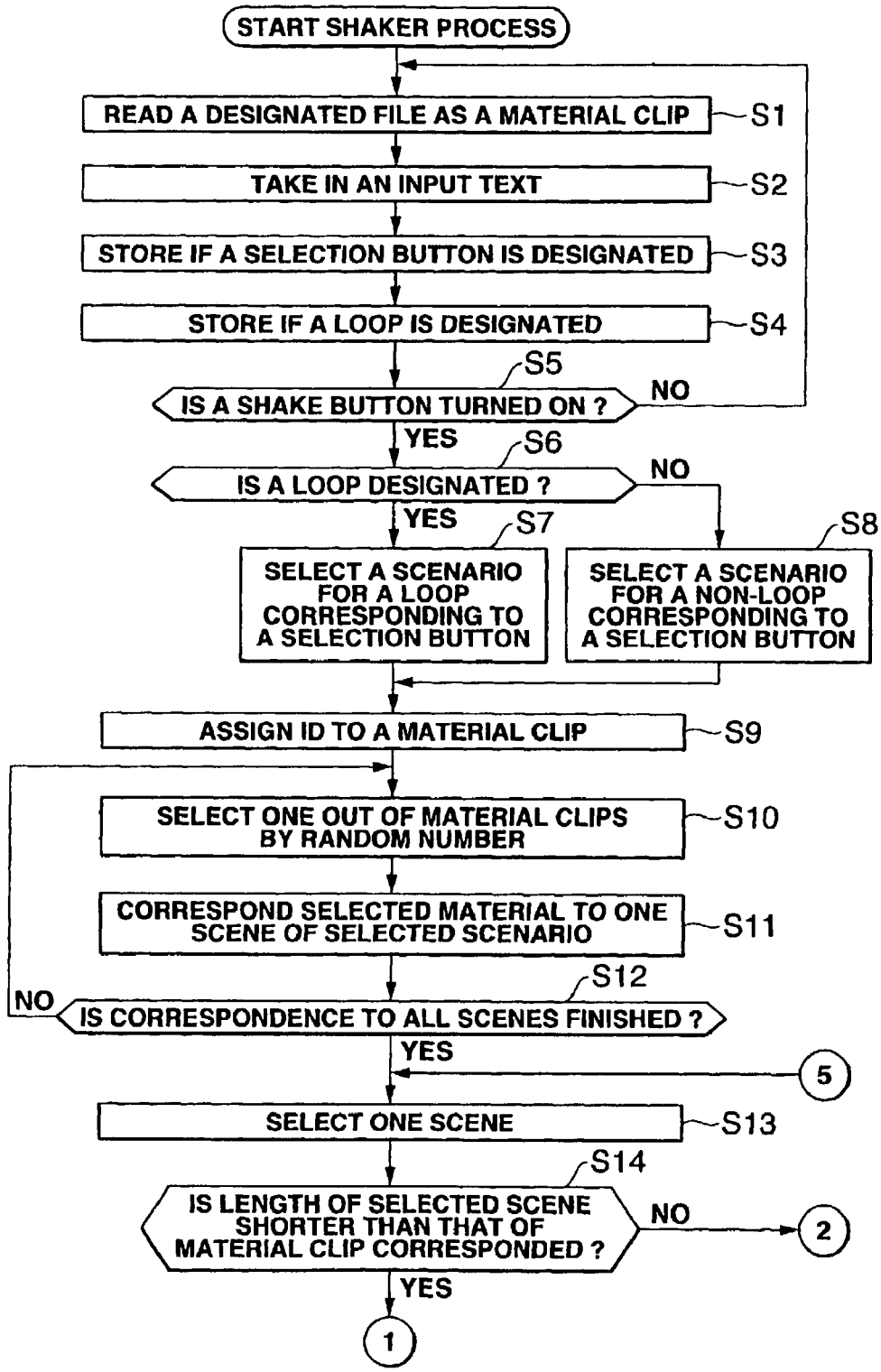
FIGS. 25A to 25C are respectively flowcharts for explaining shaker processing.
Figure 25B:
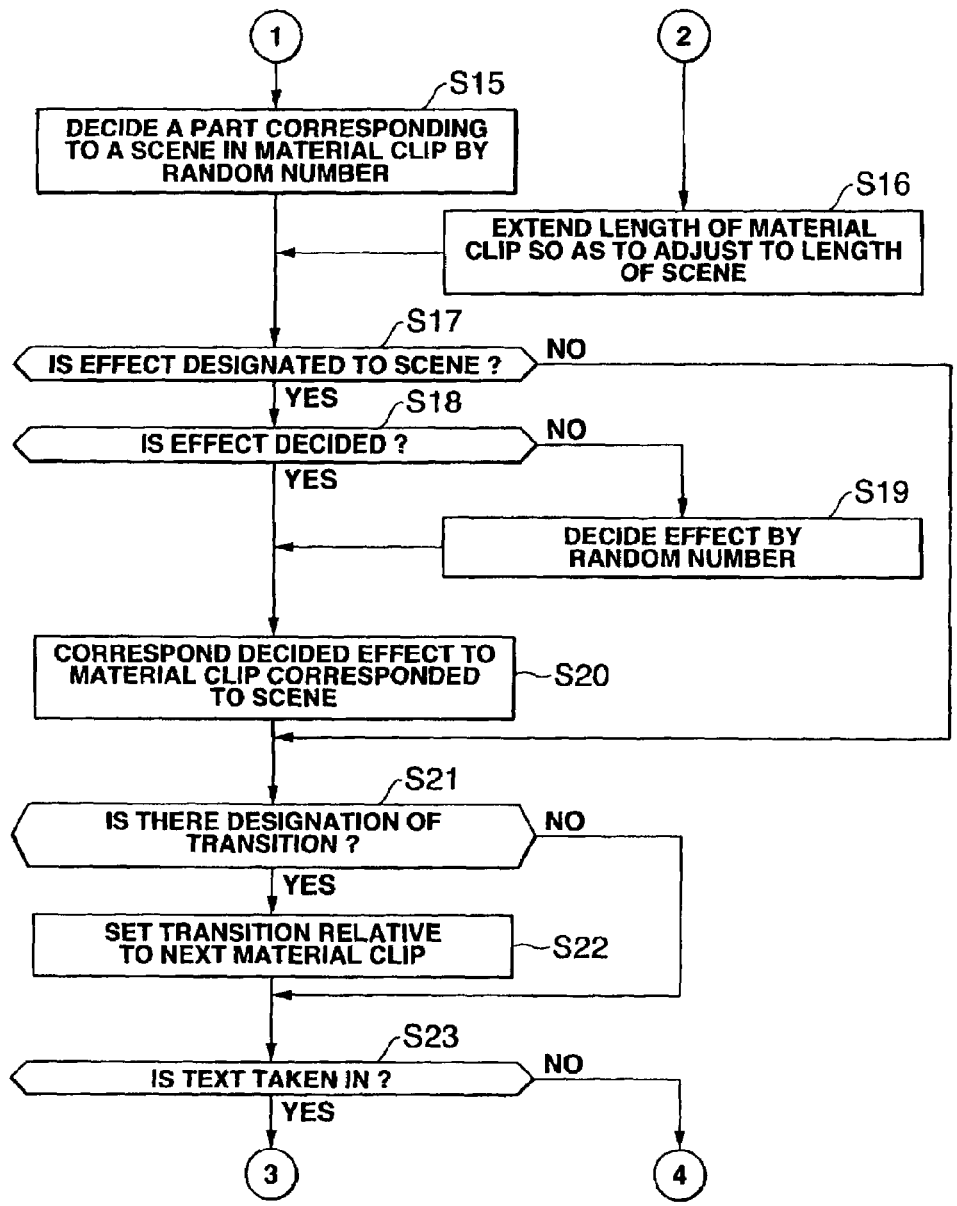
Figure 25C:
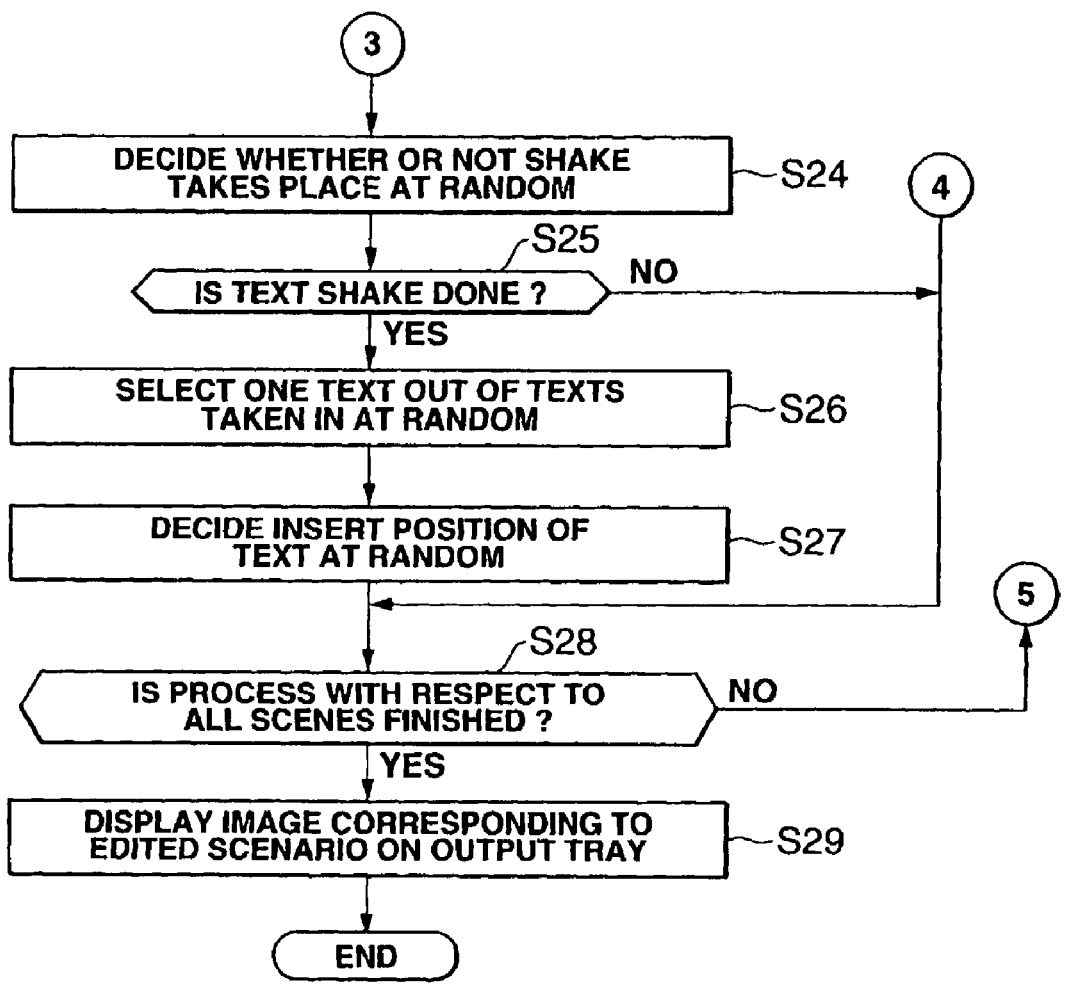

It is noted that even the processes shown in the flowcharts of FIGS. 25A to 25C, the rendering process is not actually carried out, but this is a process that editing information as shown in FIG. 24 is merely prepared. As a consequence, for example, it is possible to edit. scenario whose length is 30 seconds in a short period of time of ten seconds at the most.

The program which executes the above-described process can be provided for a user in a state that is installed in advance in the hard disk 67 as a storage medium housed in the personal computer 1 or in ROM 70 as a semiconductor memory.

Alternatively, the program can be provided as a package software in which it is temporarily or permanently stored in the magnetic disk 121 such as a floppy disk, the optical disk 122 such as CD-ROM (Compact Disk-Read Only Memory), the optical magnetic disk 123, or the semiconductor memory 124.

Further, it is possible that the program is transferred by radio transmission from the down-load site to the personal computer 1 through an artificial satellite for digital satellite broadcasting, or transferred by wire to the personal computer 1 through a local area network or Internet, and in the personal computer, the program can be stored in the hard disk 67 housed therein or the like.

In the present invention, the medium termed hereupon means a conception in a broad sense including all the media described above.

Further, in the present invention, the step for describing the program provided by the medium includes, of course, a process carried out in a time sequence along order described, and also a process executed in parallel or individually, even not always processed in a time sequence.

It is noted that in the above-described explanation, the system termed herein represents the whole apparatus constituted by a plurality of devices.

INDUSTRIAL APPLICABILITY

According to the present invention, since a predetermined one is selected out of image information so as to correspond it to a scene, it is possible to carry out the editing process quickly and simply.

The invention claimed is:

1. An information processing apparatus comprising:
    selection means for selecting a material clip from a plurality of material clips for automatic editing process;
    scenario data memory means for storing scenario data configured into a plurality of scenes having timing information including start time of each scene of said plurality of scenes;
    corresponding means for corresponding data in said selected material clip as editing objects to said each scene of said plurality of scenes;
    category means for providing special effect categories of text category, effect category, transition category, and shake category for editing said material clip;
    editing means for editing said material clip with at least one special effects selected from said special effects categories so that said plurality of scenes includes transitions between scenes with special effects scenes;
    first display means for displaying said material clips; and
    second display means for displaying said plurality of scenes including said transitions.

2. The information processing apparatus according to claim 1, wherein said plurality of scenes have predetermined lengths different from each other.

3. The information processing apparatus according to claim 2, further comprising:
    modification means for modifying said material clip corresponded by said corresponding means adjusting to said length of a scene.

4. The information processing apparatus according to claim 1, further comprising:
    modification means for modifying said material clip corresponded by said corresponding means adjusting to said length of a scene.

5. The information processing apparatus according to claim 1, further comprising:
    means for preparing and registering a row of characters to be superposed and displayed at the time of reproducing said scenario data; and
    character-row corresponding means for corresponding said row of registered characters to either of said plurality of scenes.

6. The information processing apparatus according to claim 5, further comprising:
    display position setting means for selecting and setting, at random, a display position of said row of characters from a plurality of predetermined display positions.

7. The information processing apparatus according to claim 1, wherein said scenario data memory means stores a plurality of scenario data, and wherein said scenario data memory means further includes
    scenario data selection means capable of selecting one out of said plurality of scenario data.

8. The information processing apparatus according to claim 1, further comprising:
    effect memory means for storing effect information added to a scene; and
    effect corresponding means for corresponding, at random, said effect to any of said plurality of scenes.

9. The information processing apparatus according to claim 1, further comprising:
    reproducing means for continuously reproducing said plurality of material clips corresponded by said corresponding means on the basis of said scenario data.

10. The information processing apparatus according to claim 9, wherein said plurality of material clips is animation data.

11. The information processing apparatus according to claim 9, wherein said plurality of material clips is still image data.

12. The information processing apparatus according to claim 9, wherein said plurality of material clips is voice data.

13. An information processing method comprising:
    selecting a material clip from a plurality of material clips for automatic editing process;
    storing scenario data configured into a plurality of scenes having timing information including start time of each scene of said plurality of scenes;
    corresponding data in said selected material clip as editing objects to said each scene of said plurality of scenes;
    providing special effect categories of text category, effect category, transition category, and shake category for modifying said material clip;
    modifying said material clip with at least one special effects selected from said special effects categories so that said plurality of scenes includes transitions between scenes with special effects scenes; and
    continuously reproducing said plurality of material clips on the basis of said scenario data.

14. The information processing method according to claim 13, further comprising:
    corresponding a row of characters to be inserted to one of said plurality of scenes, wherein
    said reproducing displays said row of characters superposed at the time of reproducing said material clips of scenes to which said row of characters are corresponded.

15. The information processing method according to claim 13, further comprising:
    displaying in list images relating to said material clip; and
    displaying said images arranged relating to said material clip in order corresponded to each scene of said scenario data.

16. A program storage medium in which a program capable of being read by a computer comprising:
    selecting a material clip from a plurality of material clips for automatic editing process;
    storing scenario data configured into a plurality of scenes having timing information including start time of each scene of said plurality of scenes;
    corresponding data in said selected material clip as editing objects to said each scene of said plurality of scenes;
    providing special effect categories of text category, effect category, transition category, and shake category for modifying said material clip;
    modifying said material clip with at least one special effects selected from said special effects categories so that said plurality of scenes includes transitions between scenes with special effects scenes; and
    continuously reproducing said plurality of material clips on the basis of said scenario data.

17. The program storage medium in which a program capable of being read by a computer according to claim 16, further comprising:

corresponding a row of characters to be inserted to one of said plurality of scenes, wherein said reproducing displays said row of characters superposed at the time of reproducing said material clips of scenes to which said row of characters are corresponded.

18. The program storage medium in which a program capable of being read by a computer according to claim 16, further comprising:

displaying in list images relating to said material clip; and displaying said images arranged relating to said material clip in order corresponded to each scene of said scenario data.

\* \* \* \* \*